(12) United States Patent
Kawamoto et al.

(10) Patent No.: US 11,054,559 B2
(45) Date of Patent: Jul. 6, 2021

(54) REFLECTIVE TRANSPARENT SCREEN HAVING METAL ALLOY THIN FILM AND CONCAVO-CONVEX STRUCTURE

(71) Applicant: AGC Inc., Chiyoda-ku (JP)

(72) Inventors: Yasushi Kawamoto, Chiyoda-ku (JP); Yukihiro Tao, Chiyoda-ku (JP); Yoko Mitsui, Chiyoda-ku (JP); Yuko Tachibana, Chiyoda-ku (JP); Kenta Sekikawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 345 days.

(21) Appl. No.: 16/002,540

(22) Filed: Jun. 7, 2018

(65) Prior Publication Data

US 2018/0292587 A1 Oct. 11, 2018

Related U.S. Application Data

(63) Continuation of application No. PCT/JP2016/088533, filed on Dec. 22, 2016.

(30) Foreign Application Priority Data

| Dec. 25, 2015 | (JP) | ............................. JP2015-254803 |
| Dec. 25, 2015 | (JP) | ............................. JP2015-254808 |
| Dec. 25, 2015 | (JP) | ............................. JP2015-255068 |

(51) Int. Cl.
  *C03C 17/36* (2006.01)
  *G02B 5/26* (2006.01)
  (Continued)

(52) U.S. Cl.
  CPC ............ *G02B 5/26* (2013.01); *C03C 17/3618* (2013.01); *G03B 21/60* (2013.01); *G03B 21/62* (2013.01)

(58) Field of Classification Search
  CPC ... C03C 17/3615; C03C 17/3618; G02B 5/26; G02B 5/285; G02B 5/286; G02B 27/022;
  (Continued)

(56) References Cited

U.S. PATENT DOCUMENTS

| 7,715,103 B2 | 5/2010 | Sprague et al. |
| 2005/0123772 A1 | 6/2005 | Coustet et al. |

(Continued)

FOREIGN PATENT DOCUMENTS

| CN | 101952749 A | 1/2011 |
| JP | 2004-522677 | 7/2004 |

(Continued)

OTHER PUBLICATIONS

International Search Report dated Feb. 28, 2017 in PCT/JP2016/088533, filed on Dec. 22, 2016 (with English Translation).

*Primary Examiner* — Ryan S Dunning
(74) *Attorney, Agent, or Firm* — Oblon, McClelland, Maier & Neustadt, L.L.P.

(57) ABSTRACT

A reflective transparent screen (1) capable of displaying an image light projected from a projector as an image to an observer who is on the same side as the projector, is provided with two transparent substrates and a metal thin film (23) sandwiched therebetween, wherein the color tone of the image light reflected from the metal thin film (23) or the image visibility is improved by adjusting the metallic composition of the metal thin film (23).

8 Claims, 3 Drawing Sheets

(51) Int. Cl.
*G03B 21/62* (2014.01)
*G03B 21/60* (2014.01)

(58) Field of Classification Search
CPC .. G02B 27/024; G02B 27/026; G02B 27/028;
G02B 27/06; G02B 27/18; G03B 21/56;
G03B 21/60; G03B 21/62
USPC ............ 353/37, 50, 64, 66, 73, 77; 359/360,
359/584–589
See application file for complete search history.

(56) References Cited

U.S. PATENT DOCUMENTS

| | | |
|---|---|---|
| 2005/0225687 A1 | 10/2005 | Yamauchi |
| 2006/0098279 A1 | 5/2006 | Yamauchi |
| 2008/0030882 A1 | 2/2008 | Ichikawa et al. |
| 2009/0022933 A1* | 1/2009 | Furomoto ............ G11B 7/2467 428/64.8 |
| 2012/0225304 A1* | 9/2012 | Imran ................. C03C 17/3639 428/433 |
| 2012/0300306 A1* | 11/2012 | Nagahama ............. G02B 5/045 359/601 |
| 2013/0181120 A1* | 7/2013 | Shinto .................. G02B 26/001 250/226 |
| 2014/0126036 A1* | 5/2014 | Neuman ............. C03C 17/3663 359/267 |
| 2015/0153565 A1* | 6/2015 | Imai ........................ G02B 7/006 359/578 |
| 2015/0192707 A1 | 7/2015 | Ehrensperger et al. |
| 2016/0064580 A1* | 3/2016 | Palm ................. H01L 31/03923 136/256 |
| 2017/0003429 A1* | 1/2017 | Kanatani ........... G02F 1/133528 |

FOREIGN PATENT DOCUMENTS

| | | |
|---|---|---|
| JP | 2005-326824 | 11/2005 |
| JP | 2006-84586 | 3/2006 |
| JP | 2006-138938 | 6/2006 |
| JP | 2010-1628 A | 1/2010 |
| JP | 2014-509963 | 4/2014 |
| JP | 2015-530959 | 10/2015 |
| JP | 2016-9149 | 1/2016 |

* cited by examiner

REFLECTIVE TRANSPARENT SCREEN HAVING METAL ALLOY THIN FILM AND CONCAVO-CONVEX STRUCTURE

TECHNICAL FIELD

The present invention relates to a reflective transparent screen to visibly display an image light projected from a projector as an image to an observer who is on the same side as the projector.

BACKGROUND ART

The following one has been proposed as a transparent member to be used for a showcase for commercial products, a display case for art works, a window of a building, showroom, vehicle or the like, a glass door, an indoor transparent partition, etc.

An image display transparent member (so-called transparent screen) whereby it is possible to see-through a sight visible on the other side of the transparent member as viewed from the observer side, and at the time of transmitting information such as a description of commercial products, etc., a status of various devices, a destination guide, transmission matters, etc., to the observer, at the time of displaying e.g. operation images of various devices to the observer, or at the time of making it impossible to see-through a sight of the other side of the transparent member to the observer for the purpose of privacy protection, security, etc., it is possible to visibly display an image light projected from the projector as an image to the observer.

As the transparent screen, there are a reflective transparent screen which visibly displays an image light projected from a projector as an image to the observer who is on the same side as the projector; and a transmitting type transparent screen which visibly displays an image light projected from the projector as an image to the observer who is on the opposite side to the projector.

As the screen which displays an image light projected from the projector, for example, a transparent member has been proposed wherein a metal layer of silver is provided between two transparent substrates (see Patent Document 1). Irregularities are formed on the surfaces of the transparent substrates sandwiching the center metal layer, and it is said that it is possible to increase the reflection at the irregularity surfaces by making the mutually facing irregularity surfaces to be in parallel.

However, improvement in the color tone of the image light reflected from the metal layer (reflective layer) or improvement in the image visibility of the reflective transparent screen is still desired.

As an example, for example, there is a problem such that silver constituting the metal layer of the transparent screen tends to be easily deteriorated and it is likely to be discolored by heat treatment during its production or by use for a long period of time, whereby the image visibility or light transmittance of the transparent screen will be lowered and its outer appearance will be impaired. Usually, since a transparent resin tends to easily include water as compared to glass, the above problem becomes particularly noticeable when the transparent substrates sandwiching the center layer are made of a transparent resin.

As another example, for example, there is a problem such that when an image light is projected to a reflective transparent screen having a metal layer made of silver, the color of the image light (reflection light) reflected from the metal layer tends to be yellowish.

As still another example, for example, there is a problem such that when an image light is projected to a reflective transparent screen having a metal layer made of silver, the color of the image light (reflection light) reflected from the metal layer tends to be yellowish. Further, there is a problem that the silver constituting the metal layer (reflective layer) in the reflective transparent screen tends to be easily deteriorated and is likely to be oxidized and blackened by heat treatment during the production or by use for a long period of time, whereby the image visibility or light transmittance of the screen will be lowered and its outer appearance will be impaired.

PRIOR ART DOCUMENT

Patent Document

Patent Document 1: JP-A-2014-509963

DISCLOSURE OF INVENTION

Technical Problem

A first embodiment of the present invention is to provide a reflective transparent screen whereby it is possible to see-through a sight of the other side of the transparent screen as viewed from the observer, it is possible to visually observe an image reflected from the transparent screen as viewed from the observer, and deterioration of the image visibility, light transmittance and outer appearance due to deterioration of the metal thin film, is suppressed.

A second embodiment of the present invention is to provide a reflective transparent screen whereby it is possible to see-through a sight of the other side of the transparent screen as viewed from the observer, it is possible to visually observe an image reflected from the transparent screen as viewed from the observer, and the color tone of reflected light from a metal thin film based on silver is improved.

A third embodiment of the present invention is to provide a reflective transparent screen whereby it is possible to see-through a sight of the other side of the transparent screen as viewed from the observer, it is possible to visually observe an image reflected from the transparent screen as viewed from the observer, the color tone of reflected light from a reflective layer based on silver is improved, and deterioration of the image visibility, light transmittance and outer appearance due to deterioration of the reflective layer, is suppressed.

Solution to Problem

The first embodiment of the present invention has the following construction.

[1] A reflective transparent screen having a metal thin film, wherein the metal thin film is constituted by an alloy comprising Ag and at least one type of metal M selected from the group consisting of Pd, Au, Pt, Cu, Ru, Ir, Rh, Os, Bi, Nd and Ge, wherein the content of Ag to the total number of metal atoms is at least 65 atomic %.

[2] The reflective transparent screen according to [1], wherein in the alloy, the content ratio of the number of atoms of metal M to the number of atoms of Ag (M/Ag) is from 0.001 to 0.35.

[3] The reflective transparent screen according to [1] or [2], wherein the alloy contains at least two types of metal M including at least one of Nd and Ge in said group.

[4] The reflective transparent screen according to any one of [1] to [3], which has a transparent resin layer in contact with the metal thin film.

[5] The reflective transparent screen according to [4], wherein a concavo-convex structure is provided on at least a part of the surface of the transparent resin layer in contact with the metal thin film.

[6] The reflective transparent screen according to any one of [1] to [5], wherein the thickness of the metal thin film is from 1 nm to 100 nm.

The second embodiment of the present invention has the following construction.

[7] A reflective transparent screen having a metal thin film, wherein the metal thin film is constituted by an alloy comprising Ag and at least one type of metal other than Ag, wherein the content of Ag to the total mass is from 70 to 95 mass %, and the metal other than Ag is one such that the color of reflected light of a thin film of a simple substance of the metal other than Ag, formed on a glass substrate having a thickness of (1.1±0.3) mm (one having a refractive index of helium lamp d line (587.56 nm) of 1.589 and an Abbe number of 33) in such a film thickness that the visible light transmittance including the glass substrate would be (60±1.5)%, would be x<0.35 and y<0.35 by chromaticity coordinates (x, y) of the XYZ color system (JIS Z8701: 1999).

[8] The reflective transparent screen according to [7], wherein the alloy is one such that the visible light reflectance of a thin film of the alloy, formed on a glass substrate having a thickness of (1.1±0.3) mm (one having a refractive index of helium lamp d line (587.56 nm) of 1.589 and an Abbe number of 33) in such a film thickness that the visible light transmittance including the glass substrate would be at least 60%, would be at least 15%.

[9] The reflective transparent screen according to [7] or [8], wherein the metal other than Ag is at least one type of metal selected from the group consisting of metals of Group 3 elements to Group 16 elements in the periodic table.

[10] The reflective transparent screen according to any one of [7] to [9], wherein the total content of the metal other than Ag in the entire mass of the alloy is from 5 to 30 mass %.

The third embodiment of the present invention has the following construction.

[11] A reflective transparent screen comprising a reflective layer, a first barrier layer in contact with the first surface of the reflective layer, and a second barrier layer in contact with the second surface of the reflective layer, wherein the first barrier layer is made of a metal thin film comprising at least one type of first metal other than Ag or an alloy thereof, or made of an oxide film comprising an oxide of the first metal, the second barrier layer is made of a metal thin film comprising at least one type of second metal other than Ag or an alloy thereof, or made of an oxide film comprising an oxide of the second metal, the first metal and the second metal constituting the metal thin films are ones such that in a thin film of a simple substance of the first metal and a thin film of a simple substance of the second metal, each formed on a glass substrate (one having a refractive index of helium lamp d line (587.56 nm) of 1.589 and an Abbe number of 33) in a film thickness of (5±3) nm, the colors of reflected lights of the thin films would be, each independently, x<0.35 and y<0.35 by chromaticity coordinates (x, y) of the XYZ color system (JIS Z8701: 1999), the oxide of the first metal and the oxide of the second metal constituting the oxide films are ones such that in a thin film of the oxide of the first metal alone and a thin film of the oxide of the second metal alone, each formed on a glass substrate (one having a refractive index of helium lamp d line (587.56 nm) of 1.589 and an Abbe number of 33) in a film thickness of (5±3) nm, the colors of reflected lights of the thin films would be, each independently, x<0.35 and y<0.35 by chromaticity coordinates (x, y) of the XYZ color system (JIS Z8701: 1999), and the reflective layer is constituted by a thin film of a metal made of Ag alone, or an alloy of Ag with at least one type of third metal other than Ag, wherein the content of Ag to the entire mass is from 70 to 100 mass %.

[12] The reflective transparent screen according to [11], wherein said first metal and said second metal are each independently at least one type of metal selected from the group consisting of metals of Group 3 elements to Group 16 elements of the periodic table.

[13] The reflective transparent screen according to [12], wherein said first metal and said second metal are each independently at least one member selected from the group consisting of Zr, Ni, Cr, Ti, Zn, Nb, Zn, Pd, In, W and Mo.

[14] The reflective transparent screen according to any one of [11] to [13], wherein the third metal is one such that in a thin film of a simple substance of the third metal, formed on a glass substrate having a thickness of (1.1±0.3) mm (one having a refractive index of helium lamp d line (587.56 nm) of 1.589 and an Abbe number of 33) in such a film thickness that its visible light transmittance including the glass substrate would be (60±1.5)%, the color of reflected light of the thin film would be x<0.37 and y<0.37 by chromaticity coordinates (x, y) of the XYZ color system (JIS Z8701: 1999).

[15] The reflective transparent screen according to [14], wherein the third metal is at least one type of metal selected from the group consisting of metals of Group 3 elements to Group 16 elements of the periodic table.

Advantageous Effects of Invention

The reflective transparent screen of the first embodiment of the present invention is one whereby it is possible to see-through a sight of the other side of the transparent screen as viewed from the observer, it is possible to visually observe an image reflected from the transparent screen as viewed from the observer, and deterioration of the image visibility, light transmittance and outer appearance due to deterioration of the metal thin film, is suppressed.

The reflective transparent screen of the second embodiment of the present invention is one whereby it is possible to see-through a sight of the other side of the transparent screen as viewed from the observer, it is possible to visually observe an image reflected from the transparent screen as viewed from the observer, and the color tone of reflected light from a metal thin film based on silver is improved.

The reflective transparent screen of the third embodiment of the present invention is one whereby it is possible to see-through a sight of the other side of the transparent screen as viewed from the observer, it is possible to visually observe an image reflected from the transparent screen as viewed from the observer, the color tone of reflected light from a reflective layer based on silver is improved, and deterioration of the image visibility, light transmittance and outer appearance due to deterioration of the reflective layer, is suppressed.

DESCRIPTION OF EMBODIMENTS

Figure 1:
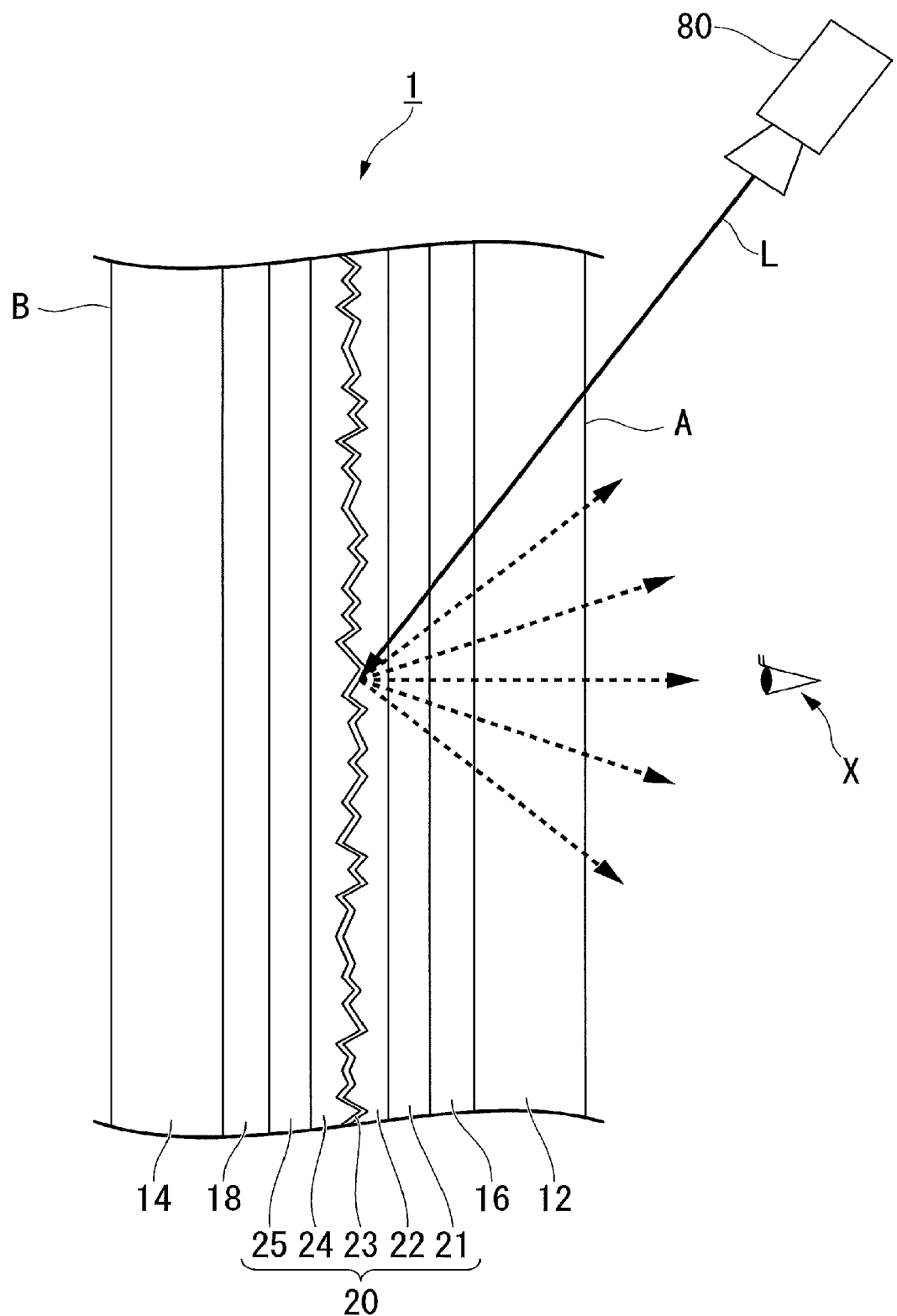
FIG. 1 is a schematic diagram showing a schematic example of an image display system provided with a reflective transparent screen of the first embodiment of the present invention and an example of the layer structure of a reflective transparent screen of the first embodiment of the present invention.

Definitions of the following terms are as follows.

The "first surface of the reflective transparent screen" is a top surface of the reflective transparent screen and means the surface on the side where an image light is projected from a projector.

The "second surface of the reflective transparent screen" is a top surface of the reflective transparent screen and means the surface on the side opposite to the first surface.

The "sight of the first surface side (second surface side)" means the image (the primary object (commercial good, art, person, etc.) and the background thereof, as well as the landscape, etc.) visible on the other side of the reflective transparent screen as viewed from the observer who is on the second surface side (first surface side) of the reflective transparent screen. In the sight, an image of image light projected from a projector and displayed on the reflective transparent screen, is not included.

A "sheet" may be of a sheet-form or may be of a continuous strip.

The "arithmetic average roughness (Ra)" is an arithmetical mean roughness to be measured in accordance with JIS B 0601: 2013 (ISO 4287: 1997, Amd.1: 2009). The standard length lr (cut-off value λc) for the roughness curve was set to be 0.8 mm.

The "angle of incidence" is the angle between the incident direction of light and the normal line of the surface of the transparent screen.

The "haze" means the percentage of transmitted light deviated by at least 0.044 rad (2.5°) from the incident light by forward scattering, among the transmitted light entered from the first surface side (or the second surface side) of the reflective transparent screen and transmitted to the second surface side (or the first surface side). That is, it is a usual haze which is measured by the method described in JIS K 7136: 2000 (ISO 14782: 1999).

The "total light transmittance" means the proportion (percentage) of the total transmitted light transmitted to the second surface side (or the first surface side), to the incident light incident at an angle of 0° from the first surface side (or the second surface side) of the reflective transparent screen. That is, it is a usual total light transmittance which is measured by the method described in JIS K 7361: 1997 (ISO 13468-1: 1996).

The "total light reflectance" means the proportion (percentage) of the total reflected light reflected to the first surface side (or the second surface side), to the incident light incident at an angle of 0° from the first surface side (or the second surface side) of the reflective transparent screen. That is, it is a usual total light reflectance which is measured by the method described in JIS K 7375: 2008. At the time of measuring the total light reflectance, in order not to let light enter into the reflective transparent screen from the second surface side (or the first surface side) opposite to the first surface side (or the second surface side) to be measured, the surface of the opposite side is covered with a blackout curtain or the like.

The "diffuse reflectance" means the proportion (percentage) of reflected light deviated by at least 0.044 rad (2.5°) from regularly reflected light reflected to the first surface side (or the second surface side), to the incident light incident at an angle of 0° from the first surface side (or the second surface side) of the reflective transparent screen. At the time of measuring the diffuse reflectance, in order not to let light enter into the transparent screen from the second surface side (or the first surface side) opposite to the first surface side (or the second surface side) to be measured, the surface of the opposite side is covered with a blackout curtain. Further, an aperture with the same diameter as the diameter of the incident light is set in close contact with the object to be measured.

The haze, the total light transmittance and the total light reflectance are values measured by using a haze meter in accordance with the above JIS standard; the diffuse reflectance is a value measured at room temperature by using D65 light source as described in Japanese Industrial Standards (JIS Z8720: 2012); and the refractive index is a value measured at room temperature by using the d line (wavelength: 589 nm) of a sodium lamp.

The "low-reflection layer" means a three-dimensional shape or a layer structure for reducing reflection of light.

The "concavo-convex structure" means irregularities consisting of a plurality of convexes, a plurality of concaves, or a plurality of convexes and concaves.

The "irregular concavo-convex structure" means a concavo-convex structure wherein convexes or concaves do not periodically appear, and the sizes of convexes or concaves are uneven.

The "fine concavo-convex structure" means a concavo-convex structure wherein the average distance between the convexes or concaves is at most the wavelength of visible light.

The "visible light transmittance" is determined by the following method. First, using a spectrophotometer, the spectral transmittance at a wavelength of from 380 nm to 780 nm among all transmitted light transmitted to the second surface side (or the first surface side) to the incident light incident at an angle of 0° from the first surface side (or the second surface side) of the reflective transparent screen (the object to be measured) is measured. This measured value is multiplied by a duplex coefficient obtainable from the spectrum of the CIE daylight D65 and the wavelength distribution of the luminosity, followed by averaging, to obtain a visible light transmittance.

The "visible light reflectance" is determined by the following method. First, using a spectrophotometer, the spectral reflectance at a wavelength of from 380 nm to 780 nm among all reflected light reflected to the first surface side (or the second surface side) to the incident light incident at an angle of 5° from the first surface side (or the second surface side) of the reflective transparent screen (object to be measured) is measured. This measured value is multiplied by a duplex coefficient obtainable from the spectrum of the CIE daylight D65 and the wavelength distribution of the luminosity, followed by averaging, to obtain a visible light reflectance.

The refractive index is a value measured at room temperature using a helium lamp d line (587.56 nm).

The "chromaticity coordinates (x, y)" are chromaticity coordinates (x, y) in the XYZ color system of JIS Z8701: 1999. Here, the above Japanese Industrial Standard is one prepared without changing the technical content of the part relating to a method for displaying the color in Publication CIE No. 15.2 (1986), Colorimetry, Second edition, recommended in 1986 by the International Commission on Illumination (CIE), but is one in which provision items not stipulated in CIE No. 15.2 have been added.

"The color of reflected light of a thin film of metal simple substance formed on a glass substrate having a thickness of (1.1±0.3) mm in such a film thickness that the visible light transmittance including the glass substrate would be X %" is a color of reflected light of a thin film made of said metal simple substance in such a thickness that in the visible light region with a wavelength of from 380 nm to 780 nm, the visible light transmittance including the influence of the glass substrate would be X % (X is an optional number of from 0 to 100). The color of reflected light is measured in accordance with the measuring method (JIS Z8722: 2009) for an object color as specified in JIS Z8701: 1999. The "glass substrate" on which the thin film to be used in this measurement is formed, is a glass substrate having a smooth surface with a thickness of (1.1±0.3) mm and showing a refractive index of the helium lamp d line (587.56 nm) of 1.589 and an Abbe number of 33. Here, JIS Z8722: 2009 agrees with the method for measuring an object color specified in Publication CIE No. 15: 2004, COLORIMETRY, THIRD EDITION, recommended in 2004 by CIE. Further, the measurement of the reflected light was carried out by painting the surface of the glass substrate on the side where no thin film was formed to be black, so that the color of reflected light of the glass substrate would not be detected.

The "refractive index and Abbe number of the glass substrate" are values as measured at room temperature (from 20 to 25° C.) in accordance with the measuring method of JIS B7090: 1999 (ISO7944 1998), by the minimum deviation method using a (helium lamp d line (587.56 nm)).

"In a thin film of metal simple substance (or metal oxide alone) formed on a glass substrate (one having a refractive index of helium lamp d line (587.56 nm) of 1.589 and an Abbe number of 33) in a film thickness of (5±3) nm, the color of reflected light of the thin film" is the color of reflected light measured in accordance with the measurement method (JIS Z8722: 2009) for the object color specified in JIS Z8701:1999 in a visible light region with a wavelength of from 380 nm to 780 nm. The "glass substrate" for forming the thin film to be used in this measurement is a glass substrate having a smooth surface with a thickness of (1.1±0.3) mm and having a refractive index of d line (589 nm) of 1.589 and an Abbe number of 33. Further, the measurement of the reflected light was carried out by painting the surface of the glass substrate on the side where the reflective layer was not formed to be black, so that the color of the reflected light of the glass substrate would not be detected.

"In a thin film of a metal simple substance (or metal oxide alone) formed on a glass substrate having a thickness of (1.1±0.3) mm (one having a refractive index of helium lamp d line (587.56 nm) of 1.589 and an Abbe number of 33) in such a film thickness that the visible light transmittance including the glass substrate would be X %, the color of reflected light of the thin film" is the color of the reflected light of the thin film made of the metal simple substance (or metal oxide) having such a thickness that the visible light transmittance including the influence of the glass substrate would be X % (X is an optional number of from 0 to 100) in a visible light region with a wavelength of from 380 nm to 780 nm. The color of reflected light is measured in accordance with the measurement method (JIS Z8722: 2009) for the object color specified in JIS Z8701: 1999. The "glass substrate" for forming the thin film to be used in this measurement is a glass substrate having a smooth surface with a thickness of (1.1±0.3) mm and showing a refractive index of (helium lamp d line (587.56 nm)) of 1.589 and an Abbe number of 33. Further, the measurement of the reflected light was carried out by painting the surface of the glass substrate on which the thin film was not formed to be black, so that the color of reflected light of the glass substrate would not be detected.

First Embodiment

<Reflective Transparent Screen>

The reflective transparent screen of the first embodiment of the present invention is a reflective transparent screen having a first surface and a second surface on the opposite side thereof, which transmits either one or both of the sight of the first surface side and the sight of the second surface side to be seen through to an observer on the opposite surface side to that surface, and also displays an image light projected from the first surface side visibly as an image to an observer on the first surface side, and which has a thin metal film.

FIG. 1 is a schematic diagram showing an example of the reflective transparent screen of the first embodiment of the present invention.

The reflective transparent screen 1 is one having a light-scattering sheet 20 disposed between a first transparent substrate 12 and a second transparent substrate 14.

The first transparent substrate 12 and the light-scattering sheet 20 are bonded by a first adhesive layer 16, and the second transparent substrate 14 and the light-scattering sheet 20 are bonded by a second adhesive layer 18.

(Transparent Substrates)

The material for the first transparent substrate 12 and the second transparent substrate 14 (hereinafter collectively referred to also as a transparent substrate) may be glass, a transparent resin, etc. The materials for the respective transparent substrates may be the same or may be different.

The glass to constitute a transparent substrate may be soda lime glass, alkali-free glass, borosilicate glass, aluminosilicate glass, etc. A transparent substrate made of glass may be subjected to chemical strengthening, physical strengthening, hard coating, etc., in order to improve the durability.

The transparent resin to constitute a transparent substrate may be a polycarbonate, a polyester (polyethylene terephthalate, polyethylene naphthalate, etc.), triacetyl cellulose, a cycloolefin polymer, polymethyl methacrylate, a fluorinated resin such as an ethylene-tetrafluoroethylene copolymer (ETFE) or polytetrafluoroethylene (PTFE), etc., and, from the viewpoint of weather resistance and transparency, preferred is a polycarbonate, a polyester or a cycloolefin polymer.

As the transparent substrate, with a view to satisfying both of weight reduction and strength required for the reflective transparent screen 1, chemically strengthened glass is preferred.

As the transparent substrate, from the viewpoint of visibility of an image displayed on the transparent screen and visibility of a sight of the other side of the transparent screen, one having no birefringence is preferred.

The thickness of the transparent substrate may be any thickness so long as durability as the substrate is maintained. The thickness of the transparent substrate may, for example, be at least 0.5 mm, at least 1 mm, or at least 2 mm. Further, the thickness of the transparent substrate may, for example, be at most 10 mm, or at most 5 mm. The range of the thickness may, for example, be from 0.5 to 10 mm, from 1 to 10 mm, from 2 to 10 mm, from 1 to 5 mm, from 2 to 5 mm, etc.

The arithmetic average roughness Ra of the surface (first surface A) of the first transparent substrate 12 or the surface (second surface B) of the second transparent substrate 14 is preferably at most 0.3 µm, more preferably at most 0.05 µm. When the arithmetic average roughness Ra is at most 0.3 µm, the image light L projected from the projector 80 is less likely to be scattered, at the first surface A or at the second surface B. As a result, it is possible to suppress formation of double images to be caused by scattering of the image light L focused on the metal thin film 23 at a different position from the metal thin film 23. The arithmetic average roughness Ra of the surface (first surface A) of the first transparent substrate 12 or the surface (second surface B) of the second transparent substrate 14, is preferably at least 0.001 µm from the viewpoint of efficiency for the production of the transparent substrate and costs. The range of Ra may, for example, be from 0.001 to 0.3 µm, from 0.001 to 0.05 µm, etc.

Here, even in a case where the outermost layer of the reflective transparent screen is not a transparent substrate (e.g. in the case of a transparent film, a light-scattering layer, etc.), the preferred range of the arithmetic average roughness Ra at the first and second surfaces of the reflective transparent screen is the same as in the case where the outermost layer is a transparent substrate.

(Adhesive Layers)

The first adhesive layer 16 and the second adhesive layer 18 (hereinafter collectively referred to also as an adhesive layer) may be formed by, for example, a thermoplastic resin, a thermosetting resin or an ultraviolet curable resin.

In the case of a thermoplastic resin or a thermosetting resin, bonding is conducted by heat treatment. On the other hand, in the case of an ultraviolet curable resin, bonding is conducted by irradiation with ultraviolet light.

The thermoplastic resin may, for example, be an ethylene-vinyl acetate copolymer, a polyvinyl butyral, a plasticized polyvinyl acetal, a plasticized polyvinyl chloride, a plasticized saturated thermoplastic polyester, a thermoplastic polyurethane, an ethylene-ethyl acrylate copolymer, etc.

The thermosetting resin may be an acrylic thermosetting resin, a thermosetting epoxy resin, a polyurethane curable resin, etc.

The ultraviolet curable resin may be an acrylic photocurable resin, a photo-curable epoxy resin, an urethane acrylate-type photocurable resin, etc.

The thickness of each adhesive layer may be any thickness so long as functions as an adhesive layer are maintained, and, for example, it is preferably from 0.1 to 1.5 mm, more preferably from 0.3 to 1 mm.

(Light-Scattering Sheet)

The light-scattering sheet 20 comprises a first transparent film 21; a first transparent layer 22 provided on the surface of the first transparent film 21 and having a concavo-convex structure on its surface; a metal thin film 23 which is formed along the concavo-convex structure side surface of the first transparent layer 22 and which transmits part of incident light; a second transparent layer 24 provided so as to cover the surface of the metal thin film 23; and a second transparent film 25 provided on the surface of the second transparent layer 24.

The second transparent film 25 may be omitted.

In FIG. 1, the light-scattering sheet 20 has, sequentially from the first surface A side, the first transparent film 21, the first transparent layer 22, the metal thin film 23, the second transparent layer 24, the second transparent film 25, in this order, but the disposition of the first transparent film 21 and the second transparent film 25 may be reversed.

(Transparent Films)

The first transparent film 21 and the second transparent film 25 (hereinafter collectively referred to also as a transparent film) may each be a transparent resin film or a thin glass film.

As the transparent resin to constitute the transparent resin film, a polycarbonate, a polyester (polyethylene terephthalate, polyethylene naphthalate, etc.), triacetyl cellulose, a cycloolefin polymer, a polymethyl methacrylate, etc. may be mentioned.

The thickness of the transparent film is preferably a thickness whereby a roll-to-roll process can be applied, and, for example, it is preferably from 0.01 to 0.5 mm, more preferably from 0.05 to 0.3 mm, further preferably at most 0.2 mm.

(Transparent Layers)

The first transparent layer 22 and the second transparent layer 24 (hereinafter collectively referred to also as a transparent layer) are each preferably a transparent resin layer. Materials for the respective transparent layers may be the same or different, but are preferably the same.

As the transparent resin to constitute the transparent resin layer, preferred is cured product of a photocurable resin (acrylic resin, epoxy resin, etc.), a cured product of a thermosetting resin (acrylic resin, epoxy resin, etc.), or a thermoplastic resin (polyester resin, acrylic resin, polyolefin resin, polycarbonate resin, polyimide resin, polyethylene resin, urethane resin, ionomer resin, ethylene-vinyl acetate copolymer resin, polyvinyl butyral resin, fluorinated resin such as ETFE or PTFE, silicone resin, etc.). The yellow index of the transparent resin is, from the viewpoint of maintaining transparency so that the function as a window in the reflective transparent screen 1 is not impaired, preferably at most 10, more preferably at most 5. The yellow index may be 0.

The thickness of the transparent layer (excluding the part where the concavo-convex structure is formed) may be any thickness so long as it can be easily formed by a roll-to-roll process, and, for example, it is preferably from 0.5 to 50 µm.

The transmittance of the transparent layer is preferably from 50 to 100%, more preferably from 75 to 100%, further preferably from 90 to 100%.

The arithmetic average roughness Ra of the concavo-convex structure formed on the surface of the first transparent layer 22 is preferably from 0.01 to 20 µm, more preferably from 0.01 to 10 µm, further preferably from 0.01 to 1 µm. When the arithmetic average roughness Ra is within the above range, the viewing angle of a projected image will be wide, the specular reflection light will be visible without looking it directly, and graininess by the concavo-convex structure will be suppressed. The arithmetic average roughness Ra being at most 10 µm, is more preferred in that the concavo-convex structure will be unobtrusive when seeing through the sight of the other side of the reflective transparent screen 1. The arithmetic average roughness Ra being at least 1 µm, is preferred, since visibility of the sight of the other side of the reflective transparent screen 1 will be more increased. The arithmetic average roughness Ra of the concavo-convex structure is measured within a range of an optional square of vertical 50 mm and lateral 50 mm.

The concavo-convex structure may be any of an irregular concavo-convex structure, a microlens array, a hologram, etc. An irregular concavo-convex structure is preferred in that the viewing angle and reflected light intensity will be good.

(Metal Thin Film)

The metal thin film 23 is one to transmit a part of light entered into the metal thin film 23 and to reflect another part, and is constituted by an alloy comprising Ag and at least one type of metal M selected from the group consisting of Pd, Au, Pt, Cu, Ru, Ir, Rh, Os, Bi, Nd and Ge. The content of Ag to the number of all metal atoms of the alloy in the metal film 23 is at least 65 atomic %.

The metal thin film 23 in FIG. 1 has an irregular concavo-convex structure reflecting the irregular concavo-convex structure of the transparent layer.

The alloy in the metal thin film 23 preferably contains at least two types of metal M including at least one of Nd and Ge among the above group, since it is thereby possible to make the effect of preventing deterioration to be higher.

The proportion of Ag in the total number of metal atoms in the alloy in the metal film 23 is, from the viewpoint of improving the visibility of a projected image light, at least 65 atomic %, more preferably at least 85 atomic %, further preferably at least 95 atomic %. The rest is preferably occupied by at least one type of metal M. The upper limit of the proportion is less than 100 atomic %, preferably at most 99.9 atomic %. As the range of the proportion, for example, the range of the proportion may be from 65 to 99.9 atomic %, from 85 to 99.9 atomic %, etc.

The content ratio of the number of atoms of metal M to the number of atoms of Ag in the alloy in the metal thin film 23 (M/Ag) is preferably from 0.001 to 0.35, more preferably from 0.01 to 0.15. When it is at least 0.001, the effect to prevent oxidation or migration of Ag by incorporation of metal M becomes higher. When it is at most 0.35, excellent image visibility by Ag will be further improved.

The types and contents of the atoms contained in the alloy in the metal thin film 23 are measured by using an X-ray photoelectron spectrometer.

Metal M to be contained in the alloy in the metal film 23 is, from the viewpoint of improving the heat resistance, preferably at least one member selected from the group consisting of Au, Pd, Bi, Nd, Ge, Pt, Ru and Ir, and from the viewpoint of improving wet heat resistance, more preferably at least one member selected from the group consisting of Au, Pd, Nd, Ge, Pt and Ir. Further, as described above, an alloy containing at least two types of metal M including at least one of Nd and Ge is preferred.

The thickness of the metal thin film 23 is preferably from 1 to 100 nm, more preferably from 4 to 25 nm, since it is thereby possible to exploit, without disturbing, the function attributable to the arithmetic average roughness Ra of the concavo-convex structure formed on the surface of the first transparent layer 22.

The reflectance of the metal thin film 23 is, as the range in which a sufficient gain of screen is obtainable, preferably at least 5%, more preferably at least 15%, further preferably at least 25%. The upper limit of the reflectance may, for example, be 100%. The range of the reflectance may, for example, be from 5 to 100%, from 15 to 100%, from 25 to 100%, etc.

(Low Reflective Layer)

The reflective transparent screen 1 may have a low reflective layer on the surface of the first transparent substrate 12 (first surface A). By having the low reflective layer, even in the case of image light L with a larger incident angle, reflection on the surface of the reflective transparent screen 1 is suppressed. As a result, decrease in transmittance is suppressed, and it is possible to further secure a screen gain. Further, variation in transmittance due to the location of the reflective transparent screen 1 (difference in angle of incidence) is suppressed, whereby it is possible to introduce image light L into the reflective transparent screen 1 evenly in a proper amount of light.

The low reflective layer may be one wherein an antireflection film having a low reflective layer on the surface is bonded to the surface of the first transparent substrate 12 (first surface A), or may be one formed directly on the surface of the first transparent substrate 12 (first surface A). Further, in the case of omitting the first transparent substrate 12, it may be one formed directly on the surface of the first transparent film 21.

The low reflective layer may be a single layer film having a low refractive index, a multilayer film having a plurality of dielectric films laminated, a fine concavo-convex structure, etc.

As the low reflective layer, from the viewpoint of excellent antireflection effect and abrasion resistance, preferred is a multilayer film having a plurality of dielectric films laminated, and more preferred is a multilayer film wherein the outermost surface is other than an inorganic fluoride.

The low reflective layer is preferably one wherein the outermost surface is composed of silicon oxide or aluminum oxide, more preferably one having a hydrophilic or water-repellent coating of e.g. a silane compound provided on the surface, further preferably one wherein the silane compound is a silane compound containing fluorine.

In the reflective transparent screen 1 of the present invention shown in FIG. 1, the first transparent layer 22 may be formed on the surface of either one of the transparent substrates 12 and 14. Further, the second transparent layer 24 may be such that its surface is in contact with the other one of the transparent substrates 12 and 14. In the case where the disposition of the transparent layer 22 and the transparent layer 24 is as mentioned above, the adhesive layers 16 and 18 and the transparent films 21 and 25 are unnecessary.

(Method for Producing Light-Scattering Sheet)

The light-scattering sheet 20 may be produced, for example, by forming the first transparent layer 22 on the first transparent film 21 by an imprinting method using a mold having a concavo-convex structure formed on the surface, then forming the metal thin film 23 by vapor depositing a metal on the surface of the first transparent layer 22 by physical vapor deposition, and by forming the second transparent layer 24 and the second transparent film 25 by conventional methods. As the method for forming the metal thin film 23, a chemical vapor deposition (CVD) method, or a sputtering method which is included in the physical vapor deposition (PVD) method, may also be used.

(Optical Properties of Reflective Transparent Screen)

The sum of the haze and diffuse reflectance of the reflective transparent screen 1 is from 10 to 90%, preferably from 20 to 70%, more preferably from 30 to 50%. When the sum of the haze and diffuse reflectance is at least 10%, it is possible to secure the screen gain and viewing angle. When the sum of the haze and diffuse reflectance is at most 90%, it is possible to prevent such a phenomenon that the entire reflective transparent screen 1 looks turbid. As a result, the contrast of a sight visible on the other side of the reflective transparent screen 1 as viewed from the observer X side will be improved, and thus, the visibility of the sight will be improved. Further, the contrast of an image displayed on the reflective transparent screen 1 will be improved and thus, the visibility of the image will be improved.

The haze of the reflective transparent screen 1 is preferably from 0 to 50%, more preferably from 0 to 15%, further preferably from 0 to 10%. When the haze is at most 50%, the visibility of a sight visible on the other side of the reflective transparent screen 1 as viewed from the observer X side will be further improved. The haze of the reflective transparent screen 1 is measured with respect to light incident from the second surface B side and transmitted to the first surface A side.

The diffuse reflectance of the reflective transparent screen 1 is preferably at least 5%, more preferably at least 15%, further preferably at least 30%, still further preferably at least 50%. When the diffuse reflectance is at least 5%, it is possible to further secure the screen gain. The diffuse reflectance of the reflective transparent screen 1 is preferably at most 90%, more preferably at most 80%. When the diffuse reflectance is at most 90%, the visibility of a sight visible on the other side of the reflective transparent screen 1 as viewed from the observer X side can be further improved. The range of the diffuse reflectance may, for example, be from 5 to 90%, from 5 to 80%, from 15 to 90%, from 15 to 80%, from 30 to 90%, from 30 to 80%, from 50 to 90%, from 50 to 80%, etc. The diffuse reflectance of the reflective transparent screen 1 is measured with respect to light incident from the first surface A side and reflected to the first surface A side.

The total light transmittance of the reflective transparent screen 1 is preferably from 10 to 90%, more preferably from 15 to 80%, further preferably from 25 to 75%. When the total light transmittance is at least 10%, visibility of a sight visible on the other side of the reflective transparent screen 1 as viewed from the observer X side will be excellent. When the total light transmittance is at most 90%, it is possible to secure the screen gain. The total light transmittance of the reflective transparent screen 1 is measured with respect to light incident from the second surface B side and transmitted to the first surface A side.

The total light reflectance of the reflective transparent screen 1 is preferably from 5 to 90%, more preferably from 10 to 80%, further preferably from 20 to 70%. When the total light reflectance is at least 5%, it is possible to further secure the screen gain. When the total light reflectance is at most 70%, visibility of a sight visible on the other side of the reflective transparent screen 1 as viewed from the observer X side can be further improved. The total light reflectance of the reflective transparent screen 1 is measured with respect to light incident from the first surface A side and reflected to the first surface A side.

The surface reflectance at the first surface A of the reflective transparent screen 1 is, with a view to sufficiently suppressing formation of double images, preferably at most 2%, more preferably at most 1%, further preferably at most 0.5%. The reflectance may be 0%.

The refractive index difference between layers adjacent in the reflective transparent screen 1 is preferably within 0.2 with a view to suppressing the reflectance at each layer interface to be within 0.5%, and more preferably within 0.1 with a view to bringing the reflectance at each layer interface to be within 0.1%. The refractive index difference may be zero.

<Image Display System>

FIG. 1 is a schematic diagram showing an example of an image display system having the reflective transparent screen of the first embodiment of the present invention.

The image display system comprises the reflective transparent screen 1 and a projector 80 disposed in a space on the first surface A side of the reflective transparent screen 1.

(Projector)

The projector 80 may be any projector so long as it can project image light L on the reflective transparent screen 1.

The projector 80 may be a known projector, etc. As the projector, a short focus projector is preferred from such a viewpoint that it is possible to project image light L from a short distance of from 10 to 90 cm, space saving for the image display system can be done, and it is possible to project image light L with a large incident angle, and it is difficult for a person to traverse the space between the projector 80 and the reflective transparent screen 1.

<Image Display Method>

In the reflective transparent screen 1, as shown in FIG. 1, image light L projected from the projector 80 and incident from the first surface A of the reflective transparent screen 1, is reflected and diffused at an irregular concavo-convex structure of the metal thin film 23 to form an image, which is visibly displayed as an image to the observer X who is on the same side as the projector 80.

Light of a sight of the second surface B side enters into the reflective transparent screen 1 from the second surface B, and then, a part thereof is reflected at the metal film 23 and the rest is transmitted. Thus, if the projector 80 is not projecting image light L on the reflective transparent screen 1, the observer X on the first surface A side can see-through the sight of the second surface B side. Likewise, light of a sight of the first surface A side enters into the reflective transparent screen 1 from the first surface A, and a part thereof is reflected at the metal film 23 and the rest is transmitted. Thus, if the projector 80 is not projecting image light L on the reflective transparent screen 1, an observer (not shown) on the second surface B side can see-through the sight of the first surface A side.

Further, the metal thin film 23 of the reflective transparent screen 1 has a property to block at least part of the electromagnetic waves in a wavelength range longer than the visible light. By utilizing this property, it is also possible to use the reflective transparent screen as an electromagnetic wave shield.

Advantageous Effects

By the reflective transparent screen 1 of the first embodiment of the present invention as described above, it is possible to transmit light, and thus it is possible to see-through a sight of the other side of the reflective transparent screen 1 as viewed from the observer. Further, since the reflective transparent screen 1 has a metal thin film 23, in such a state that the projector 80 is projecting image light L, an image displayed on the reflective transparent screen 1 can be viewed from the observer.

In the thin metal film 23 of the reflective transparent screen 1, by doping a specific metal M, deterioration due to oxidation or migration of silver as the main material of the metal thin film 23 is suppressed. A noble metal such as Pd, Au, Pt, Cu, Ru, Ir, Rh or Os is less likely to be combined with water or oxygen, whereby taking in (or introduction) of water or oxygen into a Ag film by metal M is less likely, and thus, it is considered that the effect to suppress deterioration due to oxidation or migration of Ag is increased. Further, when Bi is added, a Bi-rich layer will be formed on the outermost surface, and this will be oxidized, whereby it is believed that oxygen diffusion into the Ag film will be less.

Thus, deterioration of Ag is suppressed by doping the metal M, whereby it is possible to prevent deterioration of image visibility, light transmittance and outer appearance of the reflective transparent screen 1. Further, if a transparent resin is usually used as the transparent layer 22 or 24, water contained in the transparent resin is likely to diffuse into the Ag layer, whereby deterioration due to oxidation or migration of Ag used to be likely to occur, but in the case of the metal thin film 23 of the reflective transparent screen 1, it is possible to use a transparent resin which is usually likely to contain water, as the transparent layers 22 and 24 in contact with the metal thin film 23. By providing the transparent layers 22 and 24 made of a transparent resin, it is possible to obtain the reflective transparent screen 1 which is excellent in optical characteristics such as transmittance, reflectance, etc. of light, and which is lighter in weight and thinner in thickness.

Heretofore, it has been difficult to adopt such a construction that a metal layer is sandwiched by transparent resins in order to suppress deterioration by oxidation of silver constituting the metal layer of the transparent screen. However, according to the present invention, it is possible to prevent deterioration by oxidation or migration of the metal thin film 23 by doping the metal M on silver, whereby it is possible to adopt such a construction that a metal thin film 23 is sandwiched by transparent layers 22 and 24 made of a transparent resin.

Further, in a case where the metal thin film is formed on the surface of a transparent layer 22 having a concavo-convex structure, since the transparent layer 22 has a surface area due to irregularities, the amount of adsorbed water on the transparent layer 22 surface tends to be large, whereby at the time of forming an Ag film thereon, in the film growth process, Ag is considered to be susceptible to oxidation. By doping the metal M, it is possible to prevent the oxidation deterioration in the Ag film growth process.

Further, also in a case where at the time of producing the reflective transparent screen 1, the light-scattering sheet 20 is sandwiched between the first transparent substrate 12 and the second transparent substrate 14 made of glass, and they are bonded and subjected to heat treatment to prepare a laminated glass, it is possible to suppress the deterioration due to oxidation or migration of silver as the main material of the metal thin film 23. This effect becomes particularly remarkable when sandwiching the light-scattering sheet 20 via the adhesive layer 16 and adhesive layer 18, respectively, between the first transparent substrate 12 and the second transparent substrate 14. By doping the specific metal M as described above, deterioration of the metal thin film 23 due to moisture emitted from the transparent resin or adhesive layer by heat treatment, is prevented.

Other Embodiment

The first transparent substrate 12, the second transparent substrate 14, the first adhesive layer 16 and the second adhesive layer 18 provided in the reflective transparent screen 1 as described above, are not essential members of a reflective transparent screen of the present invention. For example, a light-scattering sheet 20 excluding these members may be made to be a reflective transparent screen of the present invention.

Second Embodiment

<Reflective Transparent Screen>

The reflective transparent screen of the second embodiment of the present invention is a reflective transparent screen having a first surface and a second surface on the opposite side thereof, which transmits either one or both of the sight of the first surface side and the sight of the second surface side to be seen through to an observer on the opposite surface side to that surface, and also displays an image light projected from the first surface side visibly as an image to an observer on the first surface side, and which has a thin metal film.

Figure 2:
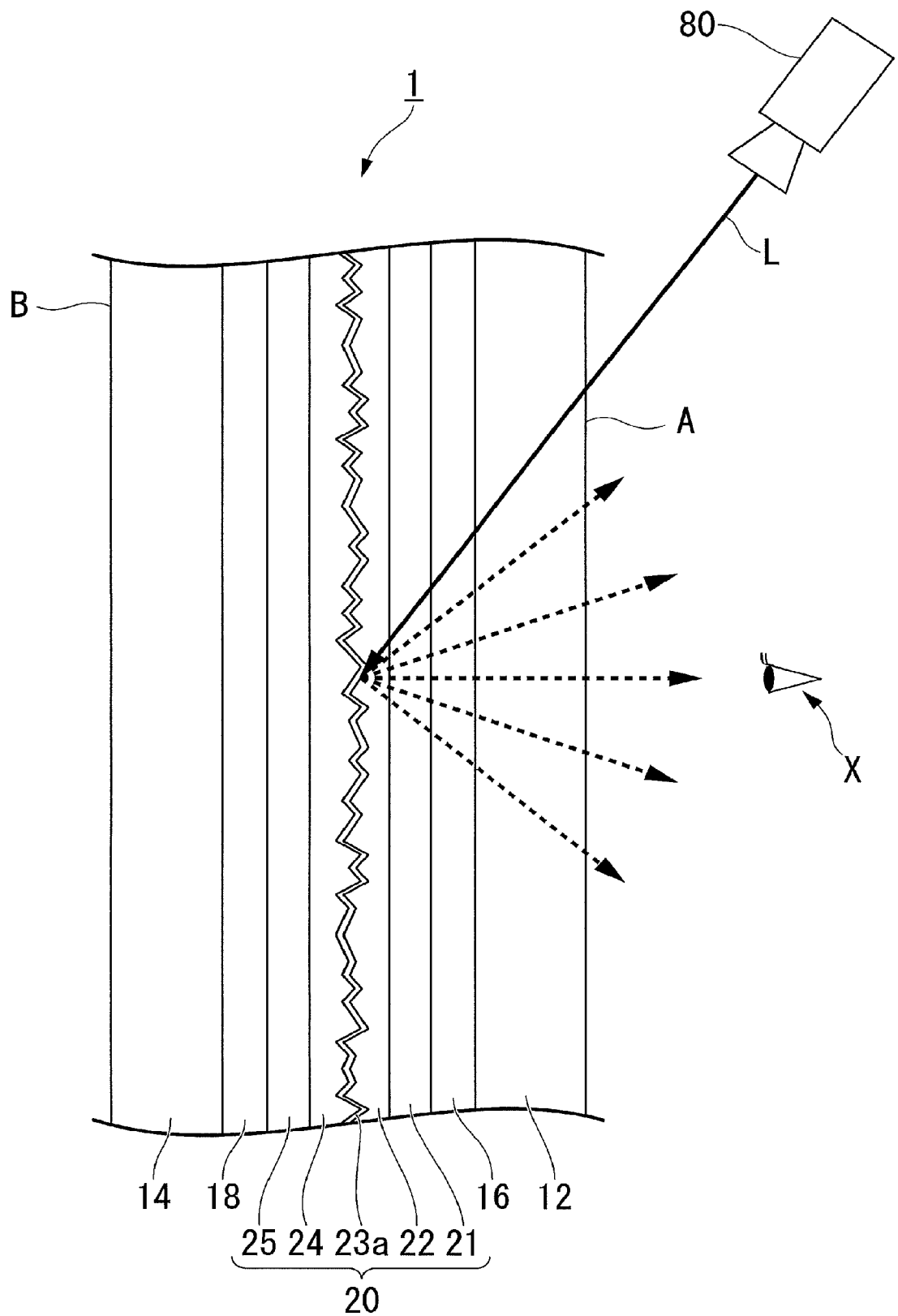
FIG. 2 is a schematic diagram showing a schematic example of an image display system provided with a reflective transparent screen of the second embodiment of the present invention and an example of the layer structure of a reflective transparent screen of the second embodiment of the present invention.

FIG. 2 is a schematic diagram showing an example of the reflective transparent screen of the second embodiment of the present invention.

The construction of the reflective transparent screen of the second embodiment is similar to the construction of the reflective transparent screen of the first embodiment. Hereinafter, components of the construction of the second embodiment which are different from the construction of the first embodiment will be described, and the same components are identified by the same reference numerals and their description will be omitted.

(Metal Thin Film)

In the reflective transparent screen 1 of the second embodiment, a metal thin film 23a is one to transmit a part of light entered into the metal thin film 23a and to reflect a part of the rest, and is constituted by an alloy of Ag and at least one type of metal other than Ag (hereinafter referred to as metal M'), wherein the content of Ag to the entire mass of the alloy is from 70 to 95 mass %.

The content of the metal M' to the entire mass of the alloy is preferably from 5 to 30 mass %. That is, it is preferred that the rest other than Ag in the alloy is constituted by metal M'.

Unless the effects of the present invention will be impaired, a small amount of elements other than the metal M' may be contained in the alloy.

Types and contents of the atoms contained in the alloy are measured by using an X-ray photoelectron spectrometer.

Metal M' is preferably one such that the color of reflected light of a thin film of a simple substance of the metal M', formed on a glass substrate having a thickness of (1.1±0.3) mm (one having a refractive index of helium lamp d line (587.56 nm) of 1.589 and an Abbe number of 33) in such a film thickness that the visible light transmittance including the glass substrate would be (60±1.5)%, would be x<0.35 and y<0.35 by chromaticity coordinates (x, y) of the XYZ color system (JIS Z8701; 1999). It is preferred that the glass substrate is a soda lime glass substrate.

Here, the reason for specifying the range of the thickness of the glass substrate is that it is sometimes difficult to prepare the glass substrate to be exactly 1.1 mm. Chromaticity coordinates of the reflected lights of the thin films formed on glass substrates different in thickness within the above range are almost the same.

Likewise, the reason for specifying the range of the visible light transmittance is that it is sometimes difficult to form a film to have such a thickness that the visible light transmittance becomes exactly 60%. Chromaticity coordinates of the reflected lights of the thin films different in thickness in the above range, are almost the same.

In the chromaticity coordinates of the color of reflected light of the metal M', $\lambda$ is preferably at least 0.25 and at most 0.33, more preferably at least 0.28 and at most 0.32.

In the chromaticity coordinates of the color of reflected light of the metal M', y is preferably at least 0.25 and at most 0.34, more preferably at least 0.29 and at most 0.33.

The above-mentioned preferred x and y may be optionally combined. The combination may, for example, be such that x is from 0.25 to 0.33 and y is from 0.25 to less than 0.34; x is from 0.25 to 0.33 and y is from 0.29 to 0.33; x is from 0.28 to 0.32 and y is from 0.25 to less than 0.34; x is from 0.28 to 0.32 and y is from 0.29 to 0.33; etc.

In the case of the chromaticity coordinates of the above-mentioned preferred x and y, it is possible to readily obtain a metal thin film 23a having the color tone of reflected light of the Ag thin film improved.

The metal M' may be one such that the chromaticity coordinates of the color of reflected light of a thin film of the metal simple substance (the film thickness thereof is such a thickness that visible light transmittance including the glass substrate would be (60±1.5)%) satisfy the above-mentioned range, among metals in Group 1 elements to Group 16 elements of the periodic table. Specifically, for example, an alkali metal such as K, Rb, etc.; a transition metals such as Sc, Y, Ti, Zr, Hf, V, Nb, Ta, Cr, Mo, W, Mn, Re, Ir, Ni, Pd, Cu, Zn, Cd, Nd, Bi, Ge, etc.; Al, In, etc. may be mentioned.

Among the metal M', metals of Group 3 elements to Group 16 elements of the periodic table are preferred, since they are less likely to react with water than the alkali metals and alkaline earth metals, and higher durability can be obtained. Further, among the above metal M', from such a viewpoint that it is easy to form an alloy with Ag, at least one member selected from Zn, Pd, In, W and Mo is more preferred. With the above preferred metal M', the color tone of reflected light of the Ag thin film will be improved, and a metal thin film 23a having a high visible light reflectance can be easily obtained.

Further, it is particularly preferred that the metal M' is at least one member selected from Nd, Bi and Ge, since it is possible to obtain, in addition to high visible light transmittance, a reflective layer 23a having a high heat resistance easily.

In a case where the metal M' is at least one member selected from Zn, Pd, In, W and Mo, if a thin film of simple substance of that metal is formed in a thickness of e.g. from 1 to 100 nm on a glass substrate with a thickness of (1.1±0.3) mm, the visible light transmittance of the thin film of the metal simple substance including the glass substrate will be (60±1.5)%. The glass substrate is preferably a soda lime glass substrate.

The metal M' is particularly preferably Pd and/or Zn. When the metal thin film 23a is made of an alloy having such metal M' combined with Ag, it is possible to improve the heat resistance of the metal film 23a.

Usually, in the production process of making a reflective transparent screen 1 into the form of a laminated glass, the heat treatment is conducted at from 120 to 140° C. for from 1 to 2 hours. An Ag film having no metal M' is susceptible to deterioration (migration occurs and transmittance changes) or discoloration by the heat treatment, but the metal thin film 23a is an alloy of Ag and the metal M', whereby heat resistance is improved. Thus, it is possible to obtain a reflective transparent screen 1 of laminated glass having excellent optical properties by utilizing the characteristic of high reflectance which Ag has.

The composition of the alloy constituting the metal thin film 23a, may, for example, be, on a mass basis, Ag/Zn=95/5 to 75/25, Ag/Pd=95/5 to 90/10, Ag/In=95/5 to 80/20, Ag/W=95/5 to 70/30, Ag/Mo=95/5 to 70/30, Ag/Al=95/5 to 90/10, Ag/Ti=95/5 to 70/30, Ag/Cu=95/5 to 90/10, etc.

When the alloy is in the above-mentioned composition, the color tone of reflected light of the Ag thin film will be improved, and a metal thin film 23a having high visible light reflectance can be easily obtained.

The alloy is one such that the visible light reflectance of the thin film of the alloy formed on a glass substrate having a thickness of (1.1±0.3) mm (one having a refractive index of helium lamp d line (587.56 nm) of 1.589 and an Abbe number of 33), in such a thickness that the visible light transmittance including the glass substrate would be at least (60±1.5)% (e.g. from 1 to 100 nm), would be preferably at least 15%, more preferably at least 18%. The upper limit of the visible light reflectance may, for example, be 38%.

When an alloy having the above visible light reflectance being at least 15% is used, the reflective transparent screen 1 shows a high screen gain, whereby image visibility projected on the metal thin film 23a will be improved.

The metal thin film 23a preferably has a visible light transmittance of at least 60% and a visible light reflectance of at least 15%. The visible light transmittance of the metal thin film 23a can be adjusted by the thickness of the metal film 23a. With a view to increasing the screen gain, it is preferred that the visible light transmittance of the metal thin film 23a is at most 85%.

Further, with a view to improving the visibility of the image projected to the reflection transparent screen 1 and formed on the thin metal film 23a (i.e. with a view to increasing the screen gain), the visible light reflectance is preferably at least 15%, more preferably at least 18%.

In the reflective transparent screen 1 of the second embodiment, the thickness of the metal film 23a is preferably from 5 to 50 nm, more preferably from 10 to 35 nm, further preferably from 10 to 20 nm. When it is at least 5 nm, the visible light reflectance can easily be made to be at least 15%. When it is at most 50 nm, the visible light transmittance can easily be made to be at most 85%.

The metal thin film 23a in FIG. 2 has an irregular concavo-convex structure reflecting the irregular concavo-convex structure of the transparent layer. The thickness of the metal film 23a is preferably from 1 to 100 nm, more preferably from 4 to 25 nm, from such a viewpoint that it is possible to utilize, without hindering, the function due to the arithmetic average roughness Ra of the irregular concavo-convex structure formed on the surface of the first transparent layer 22.

(Transparent Layer)

In the reflective transparent screen 1 of the second embodiment, the material, yellow index, thickness, transmittance and concavo-convex structure are the same as of the transparent layer in the reflective transparent screen 1 of the first embodiment, including preferred embodiments. In the reflective transparent screen 1 of the second embodiment, the arithmetic average roughness Ra of the concavo-convex structure formed on the surface of the first transparent layer 22a is preferably from 0.01 to 20 μm, more preferably from 0.05 to 10 μm, further preferably from 0.1 to 1 μm. The arithmetic average roughness Ra of the concavo-convex structure is measured in a range of a square of vertical 50 mm and lateral 50 mm.

(Method for Producing Light-Scattering Sheet)

The light-scattering sheet 20 of the reflective transparent screen 1 of the second embodiment can be produced in the same manner as the light-scattering sheet 20 of the reflective transparent screen 1 of the first embodiment.

(Optical Properties of Reflective Transparent Screen)

The preferred optical properties such as the haze and diffuse reflectance of the reflective transparent screen 1 of the second embodiment are the same as the preferred optical properties of the reflective transparent screen 1 of the first embodiment.

The ratio of the diffuse reflectance to the haze (diffuse reflectance/haze) is preferably at least 0.5, more preferably at least 1. When the diffuse reflectance/haze is at least 1, as viewed from the observer X, the visibility of a sight seen on the other side of the reflective transparent screen 1 is good, and thus, it is possible to see a projected image and a sight of the other side of the reflective transparent screen 1. Such reflective transparent screen 1 is suitable to be utilized in an environment where ambient light is present.

The visible light transmittance of the reflective transparent screen 1 of the second embodiment is preferably from 1 to 90%, preferably from 10 to 90%, more preferably from 15 to 80%, further preferably from 25 to 75%. When the visible light transmittance is at least 10%, visibility of a sight seen on the other side of the reflective transparent screen 1 as viewed from the observer X side will be excellent. When the visible light transmittance is at most 90%, it is possible to secure the screen gain. The visible light transmittance of the reflective transparent screen 1 is measured with respect to light entered from the second surface B side and transmitted to the first surface A side.

The visible light reflectance of the reflective transparent screen 1 of the second embodiment is preferably from 1 to 90%, more preferably from 5 to 70%, further preferably from 5 to 60%, also preferably from 20 to 90%, and from 20 to 50%. When the visible light reflectance is at least 20%, it is possible to further secure the screen gain. When the visible light reflectance is at most 50%, visibility of a sight seen on the other side of the reflective transparent screen 1 as viewed from the observer X side will be further improved. The visible light reflectance of the reflection type transparent screen 1 is measured with respect to light entered from the first surface A side and reflected to the first surface A side.

<Image Display System>

FIG. 2 is a schematic diagram showing an example of an image display system having the reflective transparent screen of the second embodiment of the present invention. This schematic diagram and the image display method are the same as the schematic diagram and the image display method of the reflective transparent screen of the first embodiment of the present invention, and therefore, their description will be omitted here.

Advantageous Effects

In the reflective transparent screen 1 of the second embodiment of the present invention as described above, it is possible to transmit light, and thus, it is possible to see-through a sight on the other side of the reflective transparent screen 1 as viewed from the observer. Further, the reflective transparent screen 1 has a metal thin film 23a, whereby in such a state that a projector 80 is projecting image light L, it is possible to see an image displayed on the reflective transparent screen 1 as viewed from the observer.

The chromaticity coordinates of reflected light of an Ag thin film having no metal M' are, when its film thickness is, for example, such a thickness that the visible light transmittance becomes about 60%, (chromaticity coordinates x, y=0.356, 0.364). On the other hand, the chromaticity coordinates of reflected light of a thin film made of a metal M' have, in the film thickness where the visible light transmittance becomes 60%, chromaticity coordinates close to blue (chromaticity coordinates x, y=0.15, 0.05) than the color of the reflected light of the Ag thin film. Therefore, the color of reflected light of the metal thin film 23a made of an alloy of Ag and metal M' approaches the blue than the color of the reflected light of the Ag thin film. Namely, the color tone closer to yellow of the Ag thin film is shifted to the blue side. As a result, in the metal thin film 23a, the color tone of the Ag thin film is improved, and excellent image reproducibility (e.g. a white color of projected image light is reflected as white reflected light) is obtainable.

Other Embodiment

The first transparent substrate 12, the second transparent substrate 14, the first adhesive layer 16 and the second adhesive layer 18 provided in the reflective transparent screen 1 as described above, are not essential members of a reflective transparent screen of the present invention. For example, a light-scattering sheet 20 excluding these members may be made to be a reflective transparent screen of the present invention.

Third Embodiment

<Reflective Transparent Screen>

The reflective transparent screen of the third embodiment of the present invention is one which has a first surface and a second surface on the opposite side, and which visibly transmits either one or both of the sight of the first surface side and the sight of the second surface side to an observer on the opposite surface side to that surface, and also visibly displays image light projected from the first surface side as an image to an observer on the first surface side. Further, the reflective transparent screen of the present invention has a reflective layer, a first barrier layer in contact with a first surface of the reflective layer, and a second barrier layer in contact with a second surface of the reflective layer.

Figure 3:
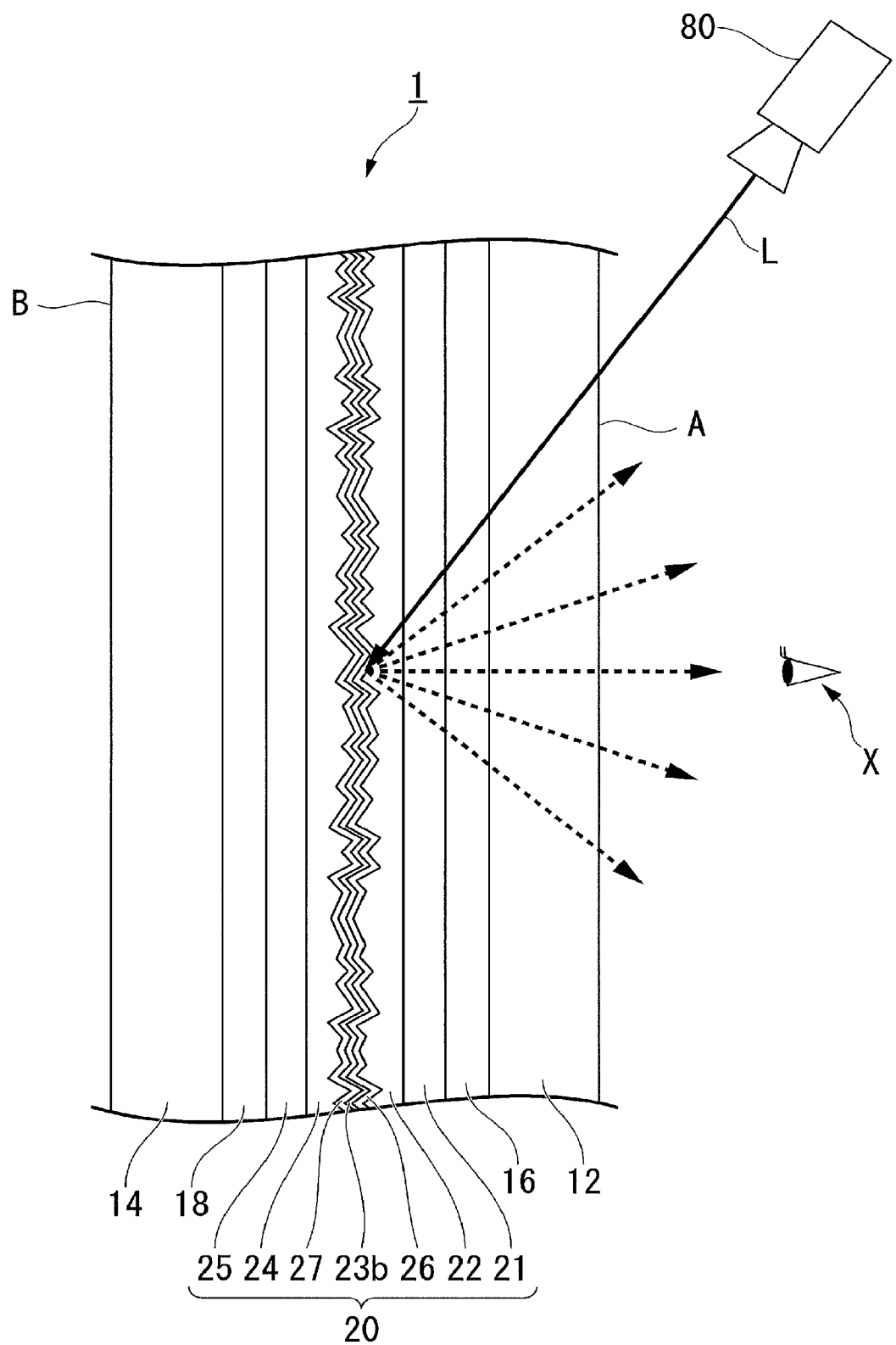
FIG. 3 is a schematic diagram showing a schematic example of an image display system provided with a reflective transparent screen of the third embodiment of the present invention and an example of the layer structure of a reflective transparent screen of the third embodiment of the present invention.

FIG. 3 is a schematic diagram showing an example of the reflective transparent screen of the present invention.

The reflective transparent screen 1 is one having a light-scattering sheet 20 disposed between a first transparent substrate 12 and a second transparent substrate 14.

The first transparent substrate 12 and the light-scattering sheet 20 are bonded by a first adhesive layer 16, and the second transparent substrate 14 and the light-scattering sheet 20 are bonded by a second adhesive layer 18.

The construction of the reflective transparent screen of the third embodiment is similar to the construction of the reflective transparent screen of the first embodiment. Hereinafter, points in which the construction of the third embodiment is different from the construction of the first embodiment will be described, and the same components will be identified by the same reference numerals and their description will be omitted.

(Light-Scattering Sheet)

The light-scattering sheet 20 comprises a first transparent film 21; a first transparent layer 22 provided on the surface of the first transparent film 21 and having an irregular concavo-convex structure on the surface; a first barrier layer 26 which transmits part of the incident light, formed along the surface of the concavo-convex structure side of the first transparent layer 22; a reflective layer 23b which transmits part of the incident light, formed on the surface of the first barrier layer; a second barrier layer 27 formed on the surface of the reflective layer 23b; a second transparent layer 24 provided so as to cover the surface of the second barrier layer 27; and a second transparent film 25 provided on the surface of the second transparent layer 24.

Here, the second transparent film 25 may be omitted.

In FIG. 3, the light-scattering sheet 20 comprises sequentially from the first surface A side, the first transparent film 21, the first transparent layer 22, the first barrier layer 26, the reflective layer 23b, the second barrier layer 27, the second transparent layer 24 and the second transparent film 25. The disposition of the first transparent film 21 and the second transparent film 25 may be reversed.

(Barrier Layers)

The first barrier layer 26 in contact with the first surface of the reflection layer 23b and the second barrier layer 27 in contact with the second surface of the reflective layer 23b, are ones which improve the color tone of the reflective layer 23b, and prevent its deterioration (to increase the deterioration resistance). Each barrier layer transmits a part of light projected towards the reflective layer 23b and reflects another part.

The first barrier layer 26 is made of a metal thin film containing at least one type of first metal other than Ag or an alloy thereof, or an oxide film containing an oxide of the first metal.

The second barrier layer 27 is made of a metal thin film containing at least one type of second metal other than Ag or an alloy thereof, or an oxide film containing an oxide of the second metal.

Unless the effects of the present invention are impaired, a small amount of elements other than the first metal and the second metal may be contained in the first barrier layer 26 and the second barrier layer 27.

The types and contents of atoms contained in the barrier layer material are measured by using an X-ray photoelectron spectrometer.

In the following, unless otherwise stated, even a case where the first metal is an alloy composed of two or more metals, may collectively be referred to as the first metal. Likewise, even a case where the second metal is an alloy composed of two or more metals, may collectively be referred to as the second metal. Further, the first metal and the second metal may collectively be referred to as a barrier metal. In the following, the first barrier layer 26 and the second barrier layer 27 may collectively be referred to as a barrier layer.

The content of the first metal or its oxide to the entire mass of the material of the first barrier layer 26 is, each independently, preferably from 70 to 100 mass %, more preferably from 80 to 100 mass %, further preferably from 90 to 100 mass %.

The content of the second metal or its oxide to the entire mass of the material of the second barrier layer 27 is, each independently, preferably from 70 to 100 mass %, more preferably from 80 to 100 mass %, further preferably from 90 to 100 mass %.

When the contents are within the above ranges, the effects to improve the color tone and to improve the deterioration resistance of the reflective layer 23b by providing the barrier layer can be obtained more easily.

The first metal or the second metal (barrier metal) to constitute the metal thin film constituting the barrier layer, is one such that the color of reflected light of a thin film of the first metal simple substance or a thin film of the second metal simple substance, formed on a glass substrate in a thickness of (5±3) nm, i.e. from 2 to 8 nm, would be x<0.35 and y<0.35 by the chromaticity coordinates (x, y) of the XYZ color system (JIS Z8701; 1999). The above glass substrate is preferably a soda lime glass substrate.

Here, the reason for specifying the range of the film thickness of the thin film is that it is sometimes difficult to form the film to have a thickness of exactly 5 nm. The chromaticity coordinates of reflected lights of the thin films different in thickness in the above range, are almost the same.

In the chromaticity coordinates of the color of reflected light of the barrier metal, x is preferably from 0.25 to 0.34, more preferably from 0.27 to 0.33, further preferably from 0.28 to 0.32.

In the chromaticity coordinates of the color of reflected light of the barrier metal, y is preferably from 0.25 to less than 0.35, more preferably from 0.27 to less than 0.35, further preferably from 0.28 to 0.34.

The above preferred x and y may be optionally combined. The combination may, for example, be such that x is from 0.25 to 0.34 and y is from 0.25 and less than 0.35; x is from 0.25 to 0.34 and y is from 0.27 to less than 0.35; x is from 0.25 to 0.34 and y is from 0.28 to 0.34; x is from 0.27 to 0.33 and y is from 0.25 to less than 0.35; x is from 0.27 to 0.33 and y is from 0.27 to less than 0.35; x is from 0.27 to 0.33 and y is from 0.28 to 0.34; x is from 0.28 to 0.32 and y is from 0.25 to less than 0.35; x is from 0.28 to 0.32 and y is from 0.27 to less than 0.35; x is from 0.28 to 0.32 and y is 0.28 to 0.34; etc. In the case of the chromaticity coordinates of the above-mentioned preferred x and y, the barrier layer exhibits a color tone closer to blue. When such barrier layers are provided on both sides of the reflective layer 23b, it is possible to easily improve the color tone close to yellow of the reflective layer 23b.

An oxide of the first metal or an oxide of the second metal (oxide of the barrier metal) to constitute the oxide film constituting the barrier layer, is one such that the color of reflected light of its thin film formed on a glass substrate in a film thickness of (5±3) nm, i.e. from 2 to 8 nm, would be x<0.35 and y<0.35 by the chromaticity coordinates (x, y) of the XYZ color system (JIS Z8701; 1999). The above glass substrate is preferably a soda lime glass substrate.

Here, the reason for specifying the range of the film thickness of the thin film is that it is sometimes difficult to form the film to have a thickness of exactly 5 nm. The chromaticity coordinates of reflected lights of the thin films different in thickness in the above range are almost the same.

In the chromaticity coordinates of the color of reflected light of the oxide of the barrier metal, x is preferably from 0.25 to 0.34, more preferably from 0.27 to 0.33, further preferably from 0.28 to 0.32.

In the chromaticity coordinates of the color of reflected light of the oxide of the barrier metal, y is preferably from 0.25 to 0.34, more preferably from 0.27 to 0.34, further preferably from 0.28 to 0.34.

The above preferred x and y may be optionally combined. The combination may, for example, be such that x is from 0.25 to 0.34 and y is from 0.25 to 0.34; x is from 0.25 to 0.34 and y is from 0.27 to 0.34; x is from 0.25 to 0.34 and y is from 0.28 to 0.34; x is from 0.27 to 0.33 and y is from 0.25 to 0.34; x is from 0.27 to 0.33 and y is from 0.27 to 0.34; x is from 0.27 to 0.33 and y is from 0.28 to 0.34; x is from 0.28 to 0.32 and y is 0.25 to 0.34; x is from 0.28 to 0.32 and y is from 0.27 to 0.34; x is from 0.28 to 0.32 and y is from 0.28 to 0.34; etc.

In the case of the chromaticity coordinates of the above-mentioned preferred x and y, the barrier layer exhibits a color closer to blue. When such barrier layers are provided on both sides of the reflective layer 23b, it is possible to easily improve the color tone close to yellow of the reflective layer 23b.

Among metals in Group 1 elements to Group 16 elements of the periodic table, the barrier metal may be one such that the chromaticity coordinates of the color of reflected light of a thin film (film thickness: (5±3) nm) made of the metal simple substance, satisfy the above-mentioned range. Specifically, for example, an alkali metal such as K, Rb, etc.; a transition metal such as Sc, Y, Ti, Zr, Hf, V, Nb, Ta, Cr, Mo, W, Mn, Re, Ir, Ni, Pd, Cu, Zn, Cd, etc.; Al, In, etc. may be mentioned.

Among barrier metals, metals in Group 3 elements to Group 16 elements in the periodic table are preferred in that they are less likely to react with water than alkali metals and alkaline earth metals, and the higher durability can be obtained. Further, among the above barrier metals, at least one member selected from Zr, Ni, Cr, Ti, Zn, Nb, Zn, Pd, In, W and Mo is more preferred.

In the case of the above-mentioned preferred barrier metals or oxides thereof, the barrier layer exhibits a proper bluish color tone, whereby it is possible to readily obtain a reflective transparent screen 1 having the color tone improved and having a high visible light reflectance.

As the barrier metal or its oxide, Zr, NiCr, $TiO_2+ZnO$ or $Nb_2O_5$ is particularly preferred. When the barrier layer is composed of such a barrier metal, the effects to improve the color tone of the barrier layer and the reflective layer 23b and to improve the resistance to deterioration will be further excellent.

Usually, in the production process for bringing a reflective transparent screen 1 in the form of a laminated glass, the heat treatment is conducted at 120 to 140° C. for 1 to 2 hours. An Ag thin film having no barrier layer is likely to undergo discoloration and deterioration (migration occurs whereby transmittance changes) by the heat treatment. The barrier layer prevents contact between the reflective layer 23b and moisture or oxygen, whereby the deterioration resistance of the reflective layer 23b will be improved. Thus, it is possible to obtain a reflective transparent screen 1 of laminated glass having excellent optical properties utilizing the characteristic of high reflectivity which Ag as the main material of the reflective layer 23b has.

The composition ratio of the barrier metal in the barrier layer may, for example, be on a mass basis, Zr=100, Ni/Cr=75/25 to 25/75, Ti/Zn=5/95 to 20/80, etc.

Within the above composition ratio, the color tone will be improved, and a reflective transparent screen 1 having a high visible light reflectance can be easily obtained.

The composition of the first barrier layer and the composition of the second barrier layer may be the same or may be different.

The thickness of the barrier layer is preferably adjusted, for example, in a range of from 1 to 70 nm with a view to balancing the visible light transmittance and the visible light reflectance.

In a case where the barrier layer is constituted by a barrier metal, the thickness of the barrier layer is preferably, for example, from 1 to 60 nm, more preferably from 1 to 10 nm, further preferably from 1 to 5 nm. In a case where the barrier layer is constituted by an oxide of the barrier metal, it is preferably from 1 to 60 nm, more preferably from 5 to 60 nm, further preferably from 10 to 60 nm.

The thickness of the first barrier layer 26 and the thickness of the second barrier layer 27 may be the same or different. For example, when the thicknesses are different, so long as x and y of the chromaticity coordinates, respectively, satisfy x<0.35 and y<0.35, the thickness of one barrier layer may be from 5 to 20 nm, and the thickness of the other barrier layer may be from 50 to 70 nm. In this way, it is easy to improve and adjust the color tone.

When the thickness of the barrier layer is at least 1 nm as mentioned above, it is possible to easily improve the color tone of the reflective transparent screen 1, and further to prevent the deterioration due to oxidation, etc. of the reflective layer 23b.

When the thickness of the barrier layer is at most 60 nm as mentioned above, it is possible to further increase the visible light transmittance of the barrier layer.

The thickness of the first barrier layer and the thickness of the second barrier layer may be the same or different. In a case where the barrier layers are oxide films made of an oxide of the barrier metal, it is preferred that the barrier layer on the side opposite to the barrier layer on the incident side of image light, is thicker, since it is thereby possible to better improve the color tone of the reflective layer 23b.

(Reflective Layer)

The reflective layer 23b is one which transmits a part of light entered into the reflective layer 23b and reflects another part, and which is constituted by Ag alone, or an alloy of Ag and at least one type of third metal other than Ag. The content of Ag to the entire mass of metals constituting the reflective layer 23b is from 70 to 100 mass %. The content of Ag in the case where the metal constituting the reflective layer 23b is an alloy, is preferably from 70 to 99.9 mass %, more preferably from 70 to 95 mass %. By this high Ag content, it is possible to obtain a reflective transparent screen 1 having excellent optical properties with high reflectance.

The content of the third metal to the entire mass of metals constituting the reflective layer 23b is preferably from 0 to 30 mass %. In a case where the metal constituting the reflective layer 23b is an alloy, the content of the third metal to the entire mass of metals constituting the reflective layer 23b is, for example, from 5 to 30 mass %. It is preferred that the rest of the metal, other than Ag, constituting the reflecting layer 23b, is constituted by the third metal. Here, so long as they do not impair the effects of the present invention, a small amount of elements other than the third metal may be contained in the metal constituting the reflective layer 23b.

The types and contents of atoms contained in the material of the reflective layer 23b are measured by using an X-ray photoelectron spectrometer.

In the reflective transparent screen 1, the reflective layer 23b is covered by the barrier layers, so that the contact between the reflective layer 23b and water or oxygen is prevented, whereby the reflective layer 23b is in a state less likely to be deteriorated. Further, migration of Ag constituting the reflective layer 23b is also suppressed. Therefore, deterioration resistance of the metal constituting the reflective layer 23b protected by the barrier layers may be high or may be low. Thus, by using Ag with a low resistance to deterioration as the main material of the reflective layer 23b, it is possible to obtain a reflective transparent screen 1 of laminated glass having excellent optical characteristics utilizing the characteristic of high reflectance which Ag has.

From the viewpoint of improving the deterioration resistance of the reflective layer 23b itself, the third metal is preferably at least one member selected from the group consisting of Pd, Au, Pt, Cu, Ru, Ir, Rh, Os and Bi, and from the viewpoint of increasing the visible light reflectance of the reflective layer 23b, the third metal is more preferably Au.

In the reflective transparent screen 1, the reflective layer 23b is covered by the barrier layers. As mentioned above, the barrier layers have a blue tint, and a yellowish tint of the reflective layer 23b is canceled by the barrier layers, so that the color tone is improved as a whole. Therefore, the chromaticity coordinates of reflected light of the reflective layer 23b alone may be shifted towards the side of yellow (chromaticity coordinates x, y=0.45, 0.55) than the chromaticity coordinates of reflected light of the Ag thin film.

From such a viewpoint that it is easy to improve the color tone of reflected light of the reflection layer 23b by the barrier layers, the third metal is preferably one such that the color of reflected light of a thin film of the third metal simple substance formed on a glass substrate having a thickness of 1.1±0.3 mm (one having a refractive index of helium lamp d line (587.56 nm) of 1.589 and an Abbe number of 33), in such a film thickness that the visible light transmittance including the glass substrate, would be (60±1.5)%, would be x<0.37 and y<0.37 by the chromaticity coordinates (x, y) of the XYZ color system (JIS Z8701; 1999).

Here, the reason for specifying the range of the thickness of the glass substrate is that it is sometimes difficult to prepare the glass substrate to be exactly 1.1 mm. The chromaticity coordinates of reflected lights of the thin films formed on glass substrates different in thickness within the above range are almost the same. Here, the measurement of the color of reflected light is carried out by painting the surface of the glass substrate on the side where the reflective layer 23b is not formed, with a black color in order to prevent the influence of reflected light of the glass substrate.

Likewise, the reason for specifying the range of the visible light transmittance is that it is sometimes difficult to form the film having such a film thickness that the visible light transmittance becomes exactly 60%. The chromaticity coordinates of reflected lights of the thin films different in thickness in the above range are almost the same.

In the chromaticity coordinates of the color of reflected light of the third metal, x is preferably from 0.25 to 0.34, more preferably from 0.30 to 0.33, further preferably from 0.29 to 0.32.

In the chromaticity coordinates of the color of reflected light of the third metal, y is preferably from 0.25 to 0.36, more preferably from 0.30 to 0.35, further preferably from 0.31 to 0.34.

The above preferred x and y may be optionally combined. The combination may, for example, be such that x is from 0.25 to 0.34 and y is from 0.25 to 0.36; x is from 0.25 to 0.34 and y is from 0.30 to 0.35; x is from 0.25 to 0.34 and y is from 0.31 to 0.34; x is from 0.30 to 0.33 and y is from 0.25 to 0.36; x is from 0.30 to 0.33 and y is from 0.30 to 0.35; x is from 0.30 to 0.33 and y is from 0.31 to 0.34; x is from 0.29 to 0.32 and y is from 0.25 to 0.36; x is from 0.29 to 0.32 and y is from 0.30 to 0.35; x is from 0.29 to 0.32 and y is from 0.31 to 0.34, etc.

With the chromaticity coordinates of the above-mentioned preferred x and y, it is possible to readily obtain a reflective layer 23b having the color tone of reflected light of the Ag thin film improved.

A specific third metal may, for example, be one such that, among metals in Group 1 elements to Group 16 elements in the periodic table, the chromaticity coordinates of the color of reflected light of a thin film of the metal simple substance formed on a glass substrate having a thickness of (1.1±0.3) mm (one having a refractive index of helium lamp d line (587.56 nm) of 1.589, and an Abbe number of 33), in such a film thickness that the visible light transmittance including the glass substrate would be (60±1.5)%, satisfy the above range. More specifically it may, for example, be an alkali metal such as K, Rb, etc.; a transition metal such as Sc, Y, Ti, Zr, Hf, V, Nb, Ta, Cr, Mo, W, Mn, Re, Ir, Ni, Pd, Au, Cu, Zn, Cd, Nd, Bi, Ge, etc.; Al, In, etc.

Among the above, the third metal is preferably a metal of Group 3 elements to Group 16 elements of the periodic table, since the higher durability can thereby be obtained.

Further, among the above, the third metal is more preferably at least one member selected from Au, Zn, Pd, In, W and Mo from the viewpoint that it is easy to form an alloy with Ag. When the third metal is as mentioned above, a reflective layer 23b having a high visible light reflectance can be easily obtained, and it is possible to easily improve the color tone of reflected light of the reflective layer 23b by the barrier layers.

Further, when the third metal is at least one member selected from Nd, Bi and Ge, it is possible to readily obtain a reflection layer 23b having high heat resistance in addition to a high visible light transmittance, such being particularly preferred.

In a case where the third metal is at least one member selected from Au, Zn, Pd, In, W, Mo, Nd, Bi and Ge, when a thin film of the metal simple substance is formed, for example, in a thickness of from 1 to 100 nm on a glass substrate having a thickness of (1.1±0.3) mm, the visible light transmittance of the thin film including the glass substrate would be (60±1.5)%. The glass substrate is preferably a soda lime glass substrate.

As the composition of the alloy to constitute the reflective layer 23b, on a mass basis, for example, Ag/Zn=95/5 to 75/25, Ag/Pd=95/5 to 90/10, Ag/In=95/5 to 80/20, Ag/W=95/5 to 70/30, Ag/Mo=95/5 to 70/30, Ag/Al=95/5 to 90/10, Ag/Ti=95/5 to 70/30, Ag/Cu=95/5 to 90/10, etc. may be mentioned.

When the alloy has the above-mentioned composition, the color tone of reflected light of the Ag thin film will be improved, and a reflective layer 23b having a high visible light reflectance can be easily obtained.

As the composition of the alloy to constitute the reflective layer 23b, on a mass basis, for example, Ag/Au=95/5 to 90/10 may be mentioned.

When the alloy has the above-mentioned composition, a reflective layer 23b having a very high visible light reflectance can be easily obtained.

When the alloy to constitute the reflective layer 23b is formed into a film on a glass substrate having a thickness of (1.1±0.3) mm (one having a refractive index of helium lamp d line (587.56 nm) of 1.589, and an Abbe number of 33) in such a thickness that the visible light transmittance including the glass substrate would be (60±1.5)% (e.g. from 1 to 100 nm), one having a higher visible light reflectance is better. The visible light reflectance is, for example, preferably at least 15%, more preferably at least 25%, further preferably at least 30%. As the upper limit value of the visible light reflectance, for example, 38% may be mentioned.

When an alloy whereby the above visible light reflectance would be at least 15%, is used, the reflective transparent screen 1 will exhibit a high screen gain, and the image visibility of image light projected to the reflective layer 23b will be improved.

The reflective layer 23b in FIG. 3, and the first barrier layer 26 and the second barrier layer 27 provided on both sides thereof, have an irregular concavo-convex structure reflecting the irregular concavo-convex structure of the transparent layers.

The thickness of the reflective layer 23b is preferably from 1 to 100 nm, more preferably from 5 to 50 nm, further preferably from 10 to 35 nm, particularly preferably from 10 to 20 nm, from such a viewpoint that it is possible to utilize, without hindering, the function due to the arithmetic average roughness Ra of the irregular concavo-convex structure formed on the surface of the first transparent layer 22.

When the thickness of the reflective layer 23b is at least 1 nm as mentioned above, it is possible to increase the visible light reflectance and thereby to improve the visibility of an image projected on the reflective transparent screen 1 (i.e. to increase the screen gain). When the thickness of the reflective layer 23b is at most 100 nm as mentioned above, it is possible to prevent the visible light transmittance from becoming too low, and to easily see a sight of the other side of the reflective transparent screen 1 as viewed from the observer.

The multi-layer structure having the first barrier layer 26, the reflective layer 23b and the second barrier layer 27 laminated in this order, on a glass substrate having a thickness of (1.1±0.3) mm (one having a refractive index of helium lamp d line (587.56 nm) of 1.589, and an Abbe number of 33), preferably exhibits a visible light transmittance of (60±1.5)% and a visible light reflectance of at least 15%. The visible light reflectance is more preferably at least 25%, further preferably at least 30%. As the upper limit value of the visible light reflectance, for example, 38% may be mentioned. Here, the visible light transmittance includes the effect of the glass substrate.

When the first barrier layer 26, the reflective layer 23b and the second barrier layer 27 used in the above multi-layer structure having a high visible light reflectance, are used in the reflective transparent screen 1, the visibility of an image projected to the reflective transparent screen 1 will be improved (the screen gain will be increased), such being preferred.

With a view to increasing the screen gain of the reflective transparent screen 1, the visible light transmittance of the above multilayer structure having the first barrier layer 26, the reflective layer 23b and the second barrier layer 27 laminated on the glass substrate to constitute the reflective transparent screen 1, is preferably at most 85%. Here, the visible light transmittance includes the effect of the glass substrate.

The visible light transmittance of the multilayer structure or the reflective transparent screen 1 can be adjusted by the thicknesses of the reflective layer 23b and the respective barrier layers.

(Transparent Layer)

In the reflective transparent screen 1 of the third embodiment, the material, the yellow index, the thickness, the transmittance and the concavo-convex structure are the same as the transparent layer of the reflective transparent screen 1 of the first embodiment, including preferred embodiments. In the reflective transparent screen 1 of the third embodiment, the arithmetic average roughness Ra of the concavo-convex structure formed on the surface of the first transparent layer 22a is preferably from 0.01 to 20 μm, more preferably from 0.05 to 10 μm, further preferably from 0.1 to 1 μm. The arithmetic average roughness Ra of the concavo-convex structure is measured in a range of any optional square of vertical 50 mm and lateral 50 mm.

(Low Reflective Layer)

The reflective transparent screen 1 of the third embodiment may have a low reflective layer on the surface of the first transparent substrate 12 (first surface A). The low reflective layer is the same as the low reflective layer of the reflective transparent screen 1 of the first embodiment, and therefore, its description will be omitted here.

(Method for Producing Light-Scattering Sheet)

The light-scattering sheet 20 may be produced, for example, by forming the first transparent layer 22 by an imprinting method using a mold having an irregular concavo-convex structure formed on the surface, vapor-depositing metals on the surface of the first transparent layer 22 by a physical vapor deposition method to form the first barrier layer 26, the reflective layer 23b and the second barrier layer 27, and forming by conventional methods, the second transparent layer 24, the first transparent film 21 and the second transparent film 25. Instead of the physical vapor deposition method, a chemical vapor deposition (CVD) method, or a sputtering method included in a physical vapor film deposition (PVD) method, may also be used.

Here, in the reflective transparent screen 1, the first transparent layer 22 may be formed on the surface of either one of the transparent substrates 12 and 14. And, the second transparent layer 24 may be such that its surface is in contact with the other one of the transparent substrates 12 and 14. In such a case, the adhesive layers 16 and 18 and the transparent films 21 and 25 are not necessary.

(Optical Properties of Reflective Transparent Screen)

The preferred optical properties such as the haze, diffuse reflectance, etc. of the reflective transparent screen 1 of the third embodiment are the same as the preferred optical properties of the reflective transparent screen 1 of the first embodiment, and therefore, their description will be omitted here.

The ratio of the diffuse reflectance to the haze (diffuse reflectance/haze) is the same as the (diffuse reflectance/haze) in the second embodiment, and therefore, its description will be omitted here.

The visible light transmittance and the visible light reflectance of the reflective transparent screen 1 of the third embodiment are the same as the visible light transmittance and the visible light reflectance of the reflective transparent screen 1 of the second embodiment, and therefore, their description will be omitted here.

The reflectance of the surface at the first surface A of the reflective transparent screen 1 is, with a view to sufficiently preventing formation of double images, preferably at most 2%, more preferably at most 1%, further preferably at most 0.5%. The reflectance may be 0%.

The difference in refractive index between adjacent layers in the reflective transparent screen 1 is, from such a viewpoint that the reflectance at the interface of the respective layers can be suppressed within 0.5%, preferably within 0.2, and from such a viewpoint that the reflectance at the interface of the respective layers can be made to be about 0.1%, more preferably within 0.1. The difference in refractive index may be 0.

<Image Display System>

FIG. 3 is a schematic diagram showing an example of an image display system having the reflective transparent screen of the third embodiment of the present invention. This schematic diagram and the image display method are the same as the schematic diagram of the reflective transparent screen of the first embodiment of the present invention and the image display method thereof, and therefore, their description will be omitted here.

<Advantageous Effect 1: Visibility of Image>

In the reflective transparent screen 1 of the third embodiment of the present invention as described above, it is possible to transmit light, and thus, it is possible to see-through a sight of the other side of the reflective transparent screen 1 as viewed from the observer. Further, the reflective transparent screen 1 has a reflective layer 23b, whereby in such a state that image light L is projected from the projector 80, it is possible to see an image displayed on the reflective transparent screen 1 as viewed from the observer.

<Advantageous Effect 2: Improvement of Color Tone>

In the reflective transparent screen 1 of the third embodiment of the present invention as described above, based on the following advantageous effect, the color tone of reflected light of the reflective layer 23b is offset by the color tones of the barrier layers 26 and 27, whereby it is possible to obtain excellent image reproducibility.

The chromaticity coordinates of reflected light of the Ag thin film having no barrier layer are, for example, (x, y=0.356, 0.364) in a case where the film is formed on a glass substrate having a thickness of (1.1±0.3) mm (one having a refractive index of helium lamp d line (587.56 nm) of 1.589 and an Abbe number of 33), in such a film thickness that the visible light transmittance including the glass substrate would be (60±1.5)%. On the other hand, the chromaticity coordinates of reflected light of the barrier layer have chromaticity coordinates close to blue (x, y=0.15, 0.05) than the color of reflected light of the Ag thin film, for example, in a case where the barrier layer is formed in a film thickness of (5±3) nm on a soda lime glass substrate. Therefore, the color of reflected light of the Ag thin film having the barrier layers provided on both sides, becomes closer to blue than the color of reflected light of the Ag thin film. Namely, the color tone close to yellow which the Ag thin film has, will be shifted to the blue side. As a result, in the Ag thin film having the barrier layers provided on both sides, the color tone of the Ag thin film is improved, and excellent image reproducibility is obtainable (e.g. white color of projected image light will be reflected as white-colored reflected light).

The above effect is not limited to the case where the reflective layer 23b is the Ag thin film, and may be similarly exhibited also in a case where the reflective layer 23b is made of an alloy of Ag and a third metal. Namely, the color tone close to yellow of the reflective layer 23b based on Ag will be shifted to the blue side by the barrier layers, whereby the color tone of the reflective layer 23b will be improved, and excellent image reproducibility will be obtained. Since it is thereby easy to adjust the color tone, the reflective layer 23b is preferably a metal thin film made of an alloy of Ag and a third metal.

Advantageous Effect 3: Improvement of Deterioration Resistance

In the reflective transparent screen 1 of the third embodiment of the present invention as described above, both sides of the reflection layer 23b are covered by barrier layers, whereby oxygen or moisture is less likely to contact the reflective layer 23b, and oxidation or migration of Ag constituting the reflective layer 23b is prevented. As a result, the deterioration of the reflection layer 23b by heating during the production of the reflective transparent screen 1 or in the use for a long period of time, is prevented (heat resistance is improved), and it is possible to prevent deterioration of the image visibility, light transmittance and outer appearance of the reflective transparent screen 1.

Since the reflective layer 23b is thus protected by the barrier layers, the reflective layer 23b itself may not be constituted by a material having high heat resistance. Therefore, the reflective layer 23b may be an Ag thin film consisting solely of Ag or may be a metal thin film made of an alloy of Ag and a third metal. As the reflective layer 23b contains Ag as the main material, the reflective transparent screen 1 will be one having excellent optical properties with high reflectance.

Further, since the reflective layer 23b is protected by the barrier layers, it is possible to provide, in contact with the barrier layers, transparent layers 22 and 24 made of a transparent resin which is likely to contain a moisture. By providing such transparent layers 22 and 24 made of a transparent resin, it is possible to obtain a reflective transparent screen 1 which is excellent in optical properties such as transmittance, reflectance, etc. of light, and which is light in weight and thin in thickness.

Heretofore, it has been required to prevent oxidation deterioration of silver constituting the metal layer of the transparent screen, and therefore, it has been difficult to adopt a construction to sandwich the metal layer with transparent resins. However, the reflective layer 23b in the present invention is provided with the barrier layers on both sides, whereby the oxidation of the reflective layer 23b is prevented, and thus, it is possible to adopt such a construction that the reflective layer 23b is sandwiched by transparent layers 22 and 24 made of a transparent resin, via the barrier layers.

Other Embodiment

The first transparent substrate 12, the second transparent substrate 14, the first adhesive layer 16 and the second adhesive layer 18, provided in the reflective transparent screen 1 as described above, are not essential members of a reflective transparent screen of the present invention. For example, a light-scattering sheet 20 excluding these members may be used as a reflective transparent screen of the present invention.

EXAMPLES

In the following, the present invention will be described in further detail with reference to Examples, but the present invention is not limited to these Examples.

Example 1A

On a transparent polyethylene terephthalate (hereinafter referred to as PET) film (thickness: 75 μm), an UV curable resin was applied by die coating, and a mold having an irregular concavo-convex structure (arithmetic mean roughness Ra=0.03 μm) on the surface was placed thereon. In such a state that the surface of the irregular concavo-convex structure was in contact with the coating film of the UV curable resin, UV light of 1,000 mJ was radiated from the side of the mold to cure the UV curable resin. The mold was peeled to obtain a PET film (first transparent film) provided with a first transparent layer (thickness: 7 μm) having an irregular concavo-convex structure on the surface.

The PET film provided with the first transparent layer was placed in a vacuum chamber of a magnetron sputtering apparatus, the degree of vacuum in the vacuum chamber was made to be at most $1.0 \times 10^{-4}$ Pa, and then, highly pure Ar gas (purity: 99.99 vol %) was introduced to $1.0 \times 10^{-1}$ Pa. Using an Ag target containing 5 atomic % of Au and using Ar gas as a sputtering gas, an electric power was applied to the sputter target to form an Ag film (thickness: 12 nm) containing Au, as a metal thin film on the surface of the irregular concavo-convex structure of the first transparent layer. The composition of the metal thin film was analyzed by an X-ray photoelectron spectrometer as shown below, whereby the proportion of Au was 4 atomic %.

On the metal thin film, an UV curable resin was applied by die coating, and another PET film (thickness: 75 μm) (second transparent film) was overlaid thereon. UV light of 1,000 mJ was radiated from the side of another PET film, to form a second transparent layer (thickness: 7 μm) made of the cured UV curable resin.

By the above method, a light-scattering sheet (reflective transparent screen) having a laminated structure of (PET film/first transparent layer with irregular concavo-convex surface/Ag film (metal thin film) containing 4 atomic % of Au/second transparent layer/PET film) was obtained.

Examples 2A and 3A

A light-scattering sheet was obtained in the same manner as in Example 1A except that sputtering was conducted by using a target different in the Au content of 3 atomic % or 1 atomic % to obtain an Ag film containing 2 atomic % or 1 atomic % of Au.

Example 4A

A light-scattering sheet was obtained in the same manner as in Example 1A except that sputtering was conducted by using an Ag target containing 5 atomic % of Bi, to form an Ag film containing 4 atomic % of Bi.

Example 5A

A light-scattering sheet was obtained in the same manner as in Example 1A except that sputtering was conducted by using an Ag target containing 1 atomic % of Bi, 0.2 atomic % of Nd and 1 atomic % of Ge, to form an Ag film (thickness: 10 nm) containing 1 atomic % of Bi, 0.2 atomic percent of Nd and 1 atomic % of Ge.

Examples 6a to 9A

A light scattering sheet was obtained in the same manner as in Example 1A except that sputtering was conducted by using an Ag target containing from 10 atomic % to 1 atomic % of Pd, to form an Ag film different in the Pd content of from 10 atomic % to 1 atomic %.

Comparative Example 1A

A light-scattering sheet was obtained in the same manner as in Example 1A except that sputtering was conducted by using a pure Ag target having no other metal added, to form a pure Ag film.

Comparative Example 2A

A light-scattering sheet was obtained in the same manner as in Example 1A except that sputtering was conducted by using an Ag target containing 1 atomic % of Si, to form an Ag film containing 2 atomic % of Si.

Comparative Example 3A

A light-scattering sheet was obtained in the same manner as in Example 1A except that sputtering was conducted by using an Ag target containing 1 atomic % of Ti, to form an Ag film containing 2 atomic % of Ti.

<Elemental Analysis>

Using an X-ray photoelectron spectrometer (manufactured by ULVAC-PHI, Inc., Quantera SXM), the metal composition at the surface of the Ag film in each Example was measured, whereupon the ratio of the total number of atoms of additional elements to the number of atoms of Ag as the main component element in each Ag film (M/Ag) was calculated. The results are shown in Tables 1 to 5.

<Heating Tests>

(Test 1) A test of heating the light-scattering sheet in each Example at 130° C. for 30 minutes was carried out.

(Test 2) A test of heating the light-scattering sheet in each Example at 130° C. for 30 minutes and then further heating it at 140° C. for 30 minutes, was carried out.

(Surface Resistance of Ag Film)

The surface resistance of the Ag film (metal thin film) in the light-scattering sheet in each Example before and after the heating test 1 or 2 was measured, whereby deterioration of the Ag film was evaluated. An increase in the surface resistance of the Ag film shows a deterioration of the surface condition due to oxidation of the Ag film or migration of or atoms. It is meant that the smaller the change in the measured value as between before and after the test, the less the deterioration. Usually, along with oxidation deterioration of the Ag film, due to an increase in color change or haze value of the Ag film, the sight see-through property and image visibility tend to be low.

The surface resistance of the Ag film in each Example was measured by a non-contact type resistance measuring apparatus according to the eddy current method (manufactured by Delcom Instruments Inc., trade name: Conductive Monitor MODEL717). By the above resistance measuring apparatus, it is possible to measure the surface resistance of the Ag film embedded in the light-scattering sheet and not exposed, by a non-contact system.

This heating test result reflects the resistance to the heating step for sandwiching the light-scattering sheet of each Example in the laminated glass. The respective measuring results are shown in Tables 1 to 3.

The total light transmittance, the total light reflectance and the transmission color YI value, of the light-scattering sheet prepared, were measured by a spectrophotometer using a D65 light source disclosed in Japanese Industrial Standards (JISZ8720: 2012).

The haze value was measured by using a haze meter in accordance with Japanese Industrial Standards (JIS K7136) and using a D65 light source disclosed in Japanese Industrial Standards (JIS Z8720: 2012).

Further, by using, as a reference example, the PET film (PET substrate) used in the preparation of the light-scattering sheet in the above Examples and Comparative Examples, the total light transmittance and haze were measured in the same manner.

TABLE 1

|  | Example 1A | | Example 2A | | Example 3A | | Example 4A | | Example 5A | | Reference Example | |
|---|---|---|---|---|---|---|---|---|---|---|---|---|
| Added elements (atomic %) | Au (4) | | Au (2) | | Au (1) | | Bi (4) | | Bi(1) + Nd(0.2) + Ga(1) | | PET substrate (1 sheet) | |
| M/Ag | 0.04 | | 0.02 | | 0.01 | | 0.04 | | Bi: 0.01, Nd: 0.002, Ge: 0.01 | | | |
| <Heating test 1> | Before | After | Before | After | Before | After | Before | After | Before | After | Before | After |
| Surface resistance (Ω/sq.) | 5.9 | 5.2 | 5.1 | 26.0 | 5.1 | 35.5 | 6.3 | 4.7 | 7.8 | 7.3 | — | — |

TABLE 1-continued

| | Example 1A | | Example 2A | | Example 3A | | Example 4A | | Example 5A | | Reference Example | |
|---|---|---|---|---|---|---|---|---|---|---|---|---|
| Total light transmittance (%) | 49.1 | 46.4 | 57.0 | 40.9 | 60.6 | 38.6 | 51.4 | 47.7 | 67.6 | 65.7 | 91.8 | 91.8 |
| Total light reflectance (%) | 34.8 | 30.9 | 28.9 | 21.9 | 27.1 | 31.6 | 33.4 | 34.4 | 15.3 | 14.2 | — | — |
| Transmitted color YI value | −30.1 | −26.9 | −20.24 | −22.54 | −18.29 | −10.85 | −28.2 | −28.6 | −16.3 | −13.5 | — | — |
| Haze (%) | 7.0 | 8.7 | 5.3 | 11.7 | 5.0 | 12.9 | 6.4 | 9.1 | 3.5 | 5.0 | 1.4 | 2.3 |
| <Heating test 2> | Before | After | | | | | Before | After | Before | After | Before | After |
| Surface resistance (Ω/sq.) | 5.9 | 5.2 | | | | | 6.3 | 4.6 | 7.8 | 7.1 | — | — |
| Total light transmittance (%) | 49.1 | 46.9 | | | | | 51.4 | 47.1 | 67.6 | 64.3 | 91.8 | 92.1 |
| Total light reflectance (%) | 34.8 | 31.1 | | | | | 33.4 | 35.0 | 15.3 | 14.7 | — | — |
| Transmitted color YI value | −30.1 | −26.2 | | | | | −28.2 | −28.1 | −16.3 | −12.0 | — | — |
| Haze (%) | 7.0 | 12.7 | | | | | 6.4 | 12.1 | 3.5 | 10.3 | 1.4 | 4.7 |

TABLE 2

| | Example 6A | | Example 7A | | Example 8A | | Example 9A | |
|---|---|---|---|---|---|---|---|---|
| Added elements (atomic %) | Pd (10) | | Pd (5) | | Pd (3) | | Pd (1) | |
| M/Ag | 0.11 | | 0.05 | | 0.03 | | 0.01 | |
| <Heating test 1> | Before | After | Before | After | Before | After | Before | After |
| Surface resistance (Ω/sq.) | 14.1 | 13.5 | 9.7 | 8.5 | 7.3 | 10.0 | 6.2 | 15.8 |
| Total light transmittance (%) | 57.7 | 56.9 | 55.8 | 54.9 | 58.8 | 55.6 | 60.2 | 45.8 |
| Total light reflectance (%) | 19.1 | 18.3 | 23.8 | 23.8 | 24.6 | 21.1 | 28.6 | 21.3 |
| Transmitted color YI value | −4.7 | −3.7 | −11.3 | −9.0 | −13.13 | −7.79 | −16.7 | −21.3 |
| Haze (%) | 3.4 | 5.5 | 3.8 | 6.1 | 4.3 | 11.0 | 4.5 | 7.6 |
| <Heating test 2> | Before | After | Before | After | | | | |
| Surface resistance (Ω/sq.) | 14.1 | 13.4 | 9.7 | 8.8 | | | | |
| Total light transmittance (%) | 57.7 | 58.6 | 55.8 | 53.3 | | | | |
| Total light reflectance (%) | 19.1 | 17.6 | 23.8 | 23.8 | | | | |
| Transmitted color YI value | −4.7 | −2.9 | −11.3 | −7.6 | | | | |
| Haze (%) | 3.4 | 8.3 | 3.8 | 9.1 | | | | |

TABLE 3

| | Comparative Example 1A | | Comparative Example 2A | | Comparative Example 3A | |
|---|---|---|---|---|---|---|
| Added elements (atomic %) | Nil | | Si (2) | | Ti (2) | |
| M/Ag | — | | 0.02 | | 0.02 | |
| <Heating test 1> | Before | After | Before | After | Before | After |
| Surface resistance (Ω/sq.) | 560 | >10$^4$ | 116.0 | >10$^4$ | 6.3 | >10$^4$ |
| Total light transmittance (%) | 41.7 | 31.0 | 51.0 | 41.5 | 58.2 | 26.9 |
| Total light reflectance (%) | 31.25 | 29.5 | 32.0 | 30.7 | 61.0 | 44.3 |
| Transmitted color YI value | −36.3 | 23.4 | −20.0 | 30.0 | −19.4 | 15.0 |
| Haze (%) | 8.0 | 36.0 | 5.2 | 32.6 | 7.5 | 37.5 |

In Comparative Examples 1A to 3A, by the heating test, the Ag film was deteriorated; the surface resistance was significantly increased; the total light transmittance was decreased by at least 9%; the haze value of haze rate was increased by at least 20%; and the transmission color was also changed greatly. Whereas, in Examples 1A to 9A, the changes in the respective characteristics as between before and after the heating test were smaller as compared with the Comparative Examples. In particular, in the case where Au was added at least 4 atomic %, or Pd was added at least 5 atomic %, and in the case where Bi was added, even after the heating test 2 wherein additional heating was conducted by raising the temperature, changes in the respective characteristics were small, and good results were obtained. Further, an increase in the haze value by heating was confirmed also in the heating of the PET substrate alone. This is due to bleeding out of the additive components in the PET substrate. The increase in the haze value in each Example includes a rise derived from the PET substrate.

Preparation of Laminated Samples

Example 2A-2, Example 8A-2, Example 3A-2

In order to eliminate the influence of deterioration of the PET substrate, by changing the PET substrate to a glass substrate, a laminated sample having the same multilayer structure (reflective transparent screen) was prepared, and the evaluation of the metal thin film was carried out. That is, the UV curable resin was applied to a glass substrate, to obtain a transparent resin film constituting the irregular concavo-convex surface (the first transparent layer) in the same manner as in Example 1A, and on the concavo-convex surface, an Ag film (thickness: 12 nm) having Au or Pd added, was formed. Further, the UV curable resin was applied thereon, and UV-cured, and on the transparent resin layer (second transparent layer) made of the cured UV resin, a glass substrate was overlaid. Thus, a laminated sample having a laminated structure of glass substrate/first transparent layer having an irregular concavo-convex surface/Ag film (metal thin film) containing Au or Pd/second transparent layer/glass substrate, was obtained.

<High-Temperature and High-Humidity Test>

The laminated sample was placed in a high-temperature and high-humidity environment of 80° C. under RH of 95%, and after expiration of a predetermined time, the surface resistance, the total light transmittance, the total light reflectance, the transmission color YI value and the haze, of the Ag film, were measured by the above-mentioned methods. The results are shown in Table 4.

TABLE 4

|  | Example 2A-2 | | | Example 8A-2 | | | Example 3A-2 | | |
| --- | --- | --- | --- | --- | --- | --- | --- | --- | --- |
| Added elements (atomic %) | Au (2) | | | Pd (3) | | | Au (1) | | |
| M/Ag | 0.02 | | | 0.03 | | | 0.01 | | |
| High temperature and high humidity test (80° C.95% RH) | Before test | 139 h later | 469 h later | Before test | 139 h later | 469 h later | Before test | 139 h later | 469 h later |
| Surface resistance (Ω/sq.) | 5.8 | 22.2 | 56.1 | 7.9 | 12.2 | 30.4 | 5.6 | 128.0 | 252 |
| Total light transmittance (%) | 59.7 | 44.5 | 45.1 | 58.6 | 54.7 | 49.0 | 61.2 | 45.2 | 46.6 |
| Total light reflectance (%) | 30.4 | 22.1 | 20.3 | 26.5 | 21.2 | 19.5 | 29.3 | 20.3 | 19.9 |
| Transmitted color YI value | −21.3 | −10.9 | 0.9 | −15.0 | −9.6 | −11.6 | −19.2 | −0.6 | 5.6 |
| Haze (%) | 3.5 | 11.1 | 12.3 | 2.7 | 6.4 | 8.4 | 3.3 | 12.9 | 14.9 |

Also in the results of the high-temperature and high-humidity test in Table 4, like the results of the heating test, the metal thin film wherein the added amount of Au was large (Example 2A-2), showed smaller variation widths for many characteristics than the metal thin film of (Example 3A-2).

<High-Temperature and High-Humidity Test>

The reflective transparent screen 1 in each Example was placed in a high-temperature and high-humidity environment at 80° C. under RH of 95%, and after from 453 to 755 hours, the surface resistance, the total light transmittance, the total light reflectance, the transmittance color YI value and the haze, of the Ag film (metal thin film), were measured. The respective measurements were carried out in the same manner as in the case of the heating test.

The result of this high-temperature and high-humidity test reflects the durability in the case where the reflective transparent screen 1 in each Example was used for a long time in normal use environment. The respective measurement results are shown in Table 5.

TABLE 5

|  | Example 1A-2 | | | Example 4A-2 | | | Example 7A-2 | | |
| --- | --- | --- | --- | --- | --- | --- | --- | --- | --- |
| Added elements (atomic %) | Au (4) | | | Bi (4) | | | Pd (5) | | |
| M/Ag | 0.04 | | | 0.04 | | | 0.05 | | |
| Intermediate film for lamination | PVB | | | EVA | | | PVB | | |
| Temperature of lamination (° C.) | 130 | | | 90 | | | 130 | | |
| High-temperature and high-humidity test (80° C.95% RH) | Before test | 453 h later | 755 h later | Before test | 453 h later | 755 h later | Before test | 453 h later | 755 h later |
| Total light transmittance (%) | 51.5 | 50.7 | 50.5 | 50.6 | 50.1 | 50.9 | 53.4 | 54.9 | 55.1 |
| Total light reflectance (%) | 31.0 | 30.9 | 31.0 | 31.9 | 31.3 | 16.0 | 23.3 | 23.2 | 23.4 |
| Transmitted color YI value | −30.1 | −22.5 | −19.9 | −28.0 | −16.6 | −12.9 | −9.3 | −8.5 | −8.2 |
| Haze (%) | 5.2 | 6.1 | 8.7 | 5.1 | 9.2 | 21.9 | 3.1 | 3.5 | 3.9 |

<Preparation Reflective Transparent Screen 1>

The light-scattering sheet prepared in Example 1A, 4A or 7A was sandwiched between two sheets of glass to prepare a reflective transparent screen 1 (see FIG. 1).

Specifically, soda lime glass (thickness: 2 mm), a polyvinyl butyral resin (hereinafter referred to as PVB) sheet (thickness: 375 μm) or an ethylene vinyl acetate resin (hereinafter referred to as EVA) sheet, the light-scattering sheet, a PVB sheet or EVA sheet in each Example, and soda lime glass (thickness: 2 mm) were laminated in this order. The laminate was put into a vacuum chamber and heated at a constant temperature of from 90 to 130° C. for 1 hour, to obtain a reflective transparent screen 1.

By looking at the other side through the reflective transparent screen 1, it was possible to see-though the sight up to a distant place. Further, as a result of projecting image light to the reflective transparent screen 1 from a projector, it was possible to sufficiently visually recognize the image displayed on the reflective transparent screen 1.

In the case where an Ag film having 4 atomic % of Au or 5 atomic % of Pd added was used, even in the high-temperature and high-humidity test for a long time, a high total light transmittance and reflectance were obtained, and a reflective transparent screen having a high durability was obtained. In the case of using an Ag film having Bi added, by adjusting the temperature to produce a laminated glass to be 90° C., it was possible to obtain a good reflective transparent screen having a high total light transmittance and reflectance, and a low haze.

(Sight See-Through Property)

The see-through property for a sight visible on the other side of the reflective transparent screen as viewed from the observer, was evaluated by the following standards. The evaluation results are shown in Table 6.

0: Good.

1: Good in a case where the front side is dark, or in a case where the outside light is less.

2: Such a level that rough recognition is possible.

3: The sight cannot be seen through.

(Image Visibility)

The visibility of an image displayed on the reflective transparent screen as viewed from the observer, was evaluated by the following standards. The evaluation results are shown in Table 6.
0: Good.
1: Good in a case where the environment is dark.
2: Such a level that rough recognition is possible.
3: The image is not visible.

TABLE 6

|  | Example 1A-2 | Example 4A-2 | Example 7A-2 |
|---|---|---|---|
| Sight see-through property | 0 | 0 | 0 |
| Image visibility | 0 | 0 | 0 |

Example 1B

On a transparent polyethylene terephthalate (hereinafter referred to as PET) film (thickness: 0.75 mm), an UV curable resin was applied by die coating, and thereon, a mold having an irregular concavo-convex structure (arithmetic average roughness (Ra): about 1.2 μm) was placed. In such a state that the surface having irregular concavo-convex structure was in contact with the coating film of the UV curable resin, UV light of 1,000 mJ was radiated from the side of the mold, to cure the UV curable resin. The mold was peeled, to obtain a PET film provided with a first transparent layer (thickness: 5 μm) having an irregular concavo-convex structure on the surface.

Using an AgZn (Ag=75 mass %, Zn=25 mass %) target, by a DC sputtering method, a transporting film forming method was carried out to form a film while transporting the above PET film provided with the transparent layer. Using Ar gas (flow rate: 30 sccm) as the sputtering gas, an electric power of 0.7 kW/cm$^2$ was applied, to form a metal thin film (thickness: 10 to 15 nm) made of an AgZn alloy having the same composition as the above target, on the surface having an irregular concavo-convex structure of the above transparent layer.

On the above metal thin film, the same UV curable resin as above was applied by die coating, and thereon, the same PET film (thickness: 0.75 mm) as above was overlaid. UV light of 1,000 mJ was radiated from the side of this PET film, to form a second transparent layer (thickness: 5 μm) made of the cured UV curable resin.

By the method as described above, a light-scattering sheet (reflective transparent screen) having a laminated structure of (PET film/first transparent layer having irregular concavo-convex structure/metal thin film/second transparent layer/PET film) was obtained.

Example 2B

A light-scattering sheet was obtained in the same manner as in Example 1B except that using an AgPd (Ag=90 mass %, Pd=10 mass %) target, a metal thin film having the same composition as the target was formed.

Example 3B

A light-scattering sheet was obtained in the same manner as in Example 1B except that using an AgCu (Ag=90 mass %, Cu=10 mass %) target, a metal thin film having the same composition as the target was formed.

Comparative Example 1B

A light-scattering sheet was obtained in the same manner as in Example 1B except that sputtering was conducted by using a pure Ag (4N) target containing no other metal, to form a metal thin film composed of pure Ag.

Comparative Example 2B

A light-scattering sheet was obtained in the same manner as in Example 1B except that using an AgAu (Ag=95 mass %, Au=5 mass %) target, a metal thin film having the same composition as the target was formed.

Comparative Example 3B

A light-scattering sheet was obtained in the same manner as in Example 1B except that using AgTi (Ag=2 atomic %, Ti=98 atomic %) target, a metal thin film having the same composition as the target was formed.

<Evaluation of Metal Thin Film>

By sputtering (transport film-forming method), a metal thin film having the same composition as the target in each Example was formed on a soda lime glass substrate having a thickness of 1.1 mm (manufactured by Asahi Glass Company, Limited, trade name: JIS R3202 Float flat glass (one having a refractive index of helium lamp d line (587.56 nm) of 1.589, and an Abbe number of 33)) to prepare a laminated substrate. At that time, by adjusting the transporting speed, the film was formed in such a thickness that the visible light transmittance of each metal thin film including the glass substrate became 60%.

With respect to each laminated substrate provided with a metal thin film having the same composition as in each Example, the visible light transmittance, the visible light reflectance and the color of reflected light were measured. The measurement results are shown in Table 7.

As the measuring apparatus, a spectrophotometer (manufactured by HITACHI, Ltd., U4100) was used.

The visible light transmittance was obtained by multiplying the value of the spectral transmittance at a wavelength of from 380 nm to 780 nm, by a duplex coefficient obtainable from the CIE daylight D65 spectrum and the wavelength distribution of the luminosity, followed by averaging.

The visible light reflectance was obtained by measurement under the condition of an incident angle of 5°, and multiplying the measured value by the duplex coefficient, followed by averaging in the same manner as for the visible light transmittance.

The color of reflected light is represented by converting a measured value of the visible light reflectance obtained from the spectrophotometer, to chromaticity coordinates (x, y) of the XYZ color system (JIS Z8701: 1999). Here, the measurement of the color of reflected light was carried out by painting the surface of the glass substrate on which the metal thin film was not formed, with black, so that the color of reflected light of the glass substrate would not be detected.

In Table 7, the "color of reflected light of metal simple substance other than Ag" is chromaticity coordinates which were measured as follows.

A thin film made of a metal simple substance other than Ag constituting each metal thin film was formed on a soda lime glass substrate having a thickness of 1.1 mm (manufactured by Asahi Glass Company, Limited, trade name: JIS R3202 float glass (one having a refractive index of helium lamp d line (587.56 nm) of 1.589, and an Abbe number of 33)) to prepare a laminated substrate separately by the same sputtering as described above. At that time, by adjusting the transporting speed, the thickness of each thin film was made to be such a thickness that the transmittance including the glass substrate became 60%. That is, a Zn thin film, a Pd thin film, an Au thin film, a Ti thin film and a Cu thin film were each independently formed on a glass substrate in such a thickness that the visible light transmittance including glass became 60%. The color of reflected light of each thin film on the laminated substrate was measured in the same manner as described above.

TABLE 7

Evaluations of metal thin film on laminated substrate

| | Target (composition ratio) | Visible light transmittance (%) | Visible light reflectance (%) | Color of reflected light of metal thin film x (upper), y (lower) | Color of reflected light of metal simple substance other than Ag x (upper), y (lower) |
|---|---|---|---|---|---|
| Example 1B | AgZn (75/25) | 60 | 26 | 0.3464 0.3519 | 0.3065 0.3269 |
| Example 2B | AgPd (90/10) | 60 | 18.7 | 0.3266 0.3399 | 0.3171 0.3325 |
| Comparative Example 1B | Ag (100) | 60 | 32 | 0.3557 0.3641 | |
| Comparative Example 2B | AgAu (95/5) | 60 | 36 | 0.3571 0.3669 | 0.3647 0.3315 |
| Comparative Example 3B | AgTi (2/98) | 60 | 14.5 | 0.3177 0.3338 | 0.3123 0.3271 |

According to Table 7, in Example 1B and Example 2B, the chromaticity coordinates of reflected light are improved towards to the blue direction as compared to Comparative Example 1B (metal thin film composed of only Ag) and the visible light reflectance is also good.

<Preparation of Reflective Transparent Screen 1>

The light-scattering sheet prepared in each of Examples 1B to 2B and Comparative Examples 1B to 3B was sandwiched by two sheets of glass to prepare a reflective transparent screen 1 (see FIG. 2).

Specifically, soda lime glass (thickness: 2 mm), a polyvinyl butyral resin (hereinafter referred to as PVB) sheet (thickness: 0.1 mm), the light-scattering sheet of each Example, a PVB sheet, and soda lime glass (thickness: 2 mm) were laminated in this order. The laminate was put into a vacuum chamber, heated at 120° C. for 1 hour, and then further heated under 1 MPa at 130° C. for 90 minutes, to obtain the reflective transparent screen 1.

By looking at the other side through the reflective transparent screen 1 of each Example, it was possible to see-through the sight up to a far distance. Further, as a result of projecting image light to the reflective transparent screen 1 from a projector, it was possible to sufficiently recognize the image displayed on the reflective transparent screen 1.

(Visible Light Transmittance)

In the same manner as in the case of the above-described laminated substrate, the visible light transmittance was measured with respect to the reflective transparent screen 1 in each Example by using a spectrophotometer (manufactured by HITACHI, Ltd., U4100).

(Visible Light Reflectance)

In the same manner as in the case of the above-described laminated substrate, the visible light reflectance was measured with respect to the reflective transparent screen 1 in each Example by using a spectrophotometer (manufactured by HITACHI, Ltd., U4100).

(Haze)

The haze was measured with respect to the reflective transparent screen 1 in each Example by using a haze measuring meter (manufactured by Suga Test Instrument Co. Ltd., trade name: Haze Computer HZ-2).

The results of the above measurements of the visible light transmittance, the visible light reflectance and the haze are shown in Table 8.

(Heat Resistance)

The haze of the above-mentioned laminate before heating was measured in the same manner as described above, and by comparing it with the haze of the reflective transparent screen 1 produced via the two heating steps, the heat resistance of the metal thin film in each Example was evaluated by the following evaluation standards. The results are shown in Table 8.

○: The change in the value of the haze after heating relative to the haze before heating is within 2%, and the change in the value of the visible light transmittance after heating relative to the visible light transmittance before heating is within 3%.

Δ: The change in the value of the haze after heating relative to the haze before heating is within 2%, and the change in the value of the visible light transmittance after heating relative to the visible light transmittance before heating exceeds 3%.

x: The change in the value of the haze after heating relative to the haze before heating exceeds 2%, and change in the value of the visible light transmittance after heating relative to the visible light transmittance before heating exceeds 3%.

TABLE 8

Evaluations of reflective transparent screen made into laminated glass

| | Target (composition ratio) | Visible light transmittance (%) | Visible light reflectance (%) | Haze | Heat resistance |
|---|---|---|---|---|---|
| Example 1B | AgZn (75/25) | 68.27 | 7.624 | 1.35 | ○ |
| Example 2B | AgPd (90/10) | 54.384 | 6.61 | 2.45 | ○ |
| Comparative Example 1B | Ag (100) | — | — | — | X |
| Comparative Example 2B | AgAu (95/5) | 51.297 | 7.646 | 2.65 | Δ |
| Comparative Example 3B | AgTi (2/98) | — | — | — | ○ |

In Table 8, no measured values are shown for the visible light transmittance, the visible light reflectance and the haze in Comparative Example 1B, but it was evident by visual observation that the metal thin film underwent a color change by heating. Further, it was confirmed that by the heating, the change in haze exceeded 2%, and the change in transmittance exceeded 3%, and thus, the evaluation of heat resistance is "x". In Table 8, no measured values are shown for the visible light transmittance, the visible light reflectance and the haze in Comparative Example 3B, but it was evident by visual observation that the reflectance was low before heating. Further, it was confirmed that by the heating, the change in haze was within 2%, and the change in transmittance was within 3%, and thus, the evaluation of heat resistance is "○".

(Sight See-Through Property)

The see-through property of a sight visible on the other side of the reflective transparent screen as viewed from the observer, was evaluated by the following standards. The evaluation results are shown in Table 9.
 0: Good.
 1: Good in a case where the front side is dark, or in a case where the outside light is less.
 2: Such a level that rough recognition is possible.
 3: The sight cannot be seen through.
(Image Visibility)

The visibility of an image displayed on the reflective transparent screen as viewed from the observer, was evaluated by the following standards. The evaluation results are shown in Table 9.
 0: Good.
 1: Good in a case where the environment is dark.
 2: Such a level that rough recognition is possible.
 3: The image is not visible.
(Improvement of Color Tone)

Improvement of the color tone of an image displayed on the reflective transparent screen as viewed from the observer, was evaluated by the following standards. The evaluation results are shown in Table 9.
 0: The color tone is improved.
 1: No improvement in color tone is observed.

TABLE 9

|  | Example 1B | Example 2B | Comparative Example 1B | Comparative Example 2B | Comparative Example 3B |
|---|---|---|---|---|---|
| Sight see-through property | 0 | 0 | 0 | 0 | 0 |
| Image visibility | 0 | 0 | 0 | 0 | 0 |
| Improvement of color tone | 0 | 0 | 1 | 1 | 0 |

Hereinafter, the present invention will be described in further detail with reference to Examples, but the present invention is not limited to these Examples.

In the following Examples and Comparative Examples, unless otherwise specified, as a soda lime glass substrate, a glass substrate of soda lime glass having a thickness (1.1±0.3) mm (manufactured by Asahi Glass Company, Limited, JIS R3202 float glass, one having a refractive index of helium lamp d line (587.56 nm) of 1.589 and an Abbe number of 33) was used.

Example 1C

On a transparent polyethylene terephthalate (hereinafter referred to as PET) film (thickness: 0.75 mm), an UV curable resin was applied by die coating, and thereon, a mold having an irregular concavo-convex structure (arithmetic average roughness (Ra): about 1.2 µm) was placed. In such a state that the surface having an irregular concavo-convex structure was in contact with the coating film of the UV curable resin, UV light of 1,000 mJ was radiated from the side of the mold, to cure the UV curing resin. The mold was peeled to obtain a PET film provided with a first transparent layer (thickness: 5 µm) having an irregular concavo-convex structure on the surface.

Using a Zr target by a DC sputtering method, a transporting film forming method was carried out to form a film while transporting the above PET film provided with the transparent layer. Using Ar gas (flow rate: 30 sccm) as the sputtering gas, an electric power of 0.7 kW/cm$^2$ was applied, to form a first barrier layer (thickness: 1 to 60 nm) consisting of Zr having the same composition as the target, on the surface having an irregular concavo-convex structure of the above transparent layer.

Then, using an AgAu (Ag=95 mass %, Au=5 mass %) target, by the same DC sputtering method, on the surface of the first barrier layer, a reflective layer (thickness: 10 to 15 nm) consisting of an AgAu alloy having the same composition as the target was formed.

Then, again by the same DC sputtering method using a Zr target, on the surface of the reflective layer, a second barrier layer (thickness: 1 to 60 nm) consisting of Zr having the same composition as the target, was formed.

On the surface of the second barrier layer having the first barrier layer, the reflective layer and the second barrier layer laminated in this order, an irregular concavo-convex structure reflecting the irregular concavo-convex structure of the above transparent layer was formed.

The thickness of the reflective layer was adjusted in such a range that the visible light transmittance including the glass substrate in the case where the reflective layer was formed alone on a soda lime glass substrate having a thickness of (1.1±0.3) mm becomes about 60%.

On the surface of the second barrier layer, the same UV curable resin as above was applied by die coating, and thereon, the same PET film as above (thickness: 0.75 mm) was overlaid. UV light of 1,000 mJ was radiated from the side of this PET film, to form a second transparent layer (thickness: 5 µm) made of the cured UV curable resin.

By the above method, a light-scattering sheet (reflective transparent screen) having a laminate structure of (PET film/first transparent layer/first barrier layer/reflective layer/second barrier layer/second transparent layer/PET film) was obtained.

Example 2C

A light-scattering sheet was obtained in the same manner as in Example 1C except that using a NiCr (Ni=50 mass %, Cr=50 mass %) target, by the same DC sputtering method, the first barrier layer and the second barrier layer were formed.

Example 3C

A light-scattering sheet was obtained in the same manner as in Example 1C except that using a titanium oxide-containing zinc oxide (TiO$_{2=10}$ mass %, ZnO=90 mass %) target, by the same DC sputtering method, the first barrier layer and the second barrier layer were formed.

Example 4C

A light-scattering sheet was obtained in the same manner as in Example 1C except that using a Nb$_2$O$_5$ target, by a DC sputtering method in a reducing atmosphere, the first barrier layer and the second barrier layer were formed.

Example 5C

A light-scattering sheet was obtained in the same manner as in Example 3C except that the reflective layer was formed by the same DC sputtering method as in Example 3C, using an AgBiNd (Ag=98.0 mass %, Bi=1.73 mass %, Nd=0.27 mass %) target as the target for forming the reflective layer. The thickness of the reflective layer was 9.6 nm, and the thicknesses of the first barrier layer and the second barrier layer were from 1 to 60 nm.

Example 6C

A light-scattering sheet was obtained in the same manner as in example 3C except that the reflective layer was formed by the same DC sputtering method as in Example 3C, using an AgBiNdGe (Ag=97.3 mass %, Bi=1.73 mass %, Nd=0.27 mass %, Ge=0.7 mass %) target as the target for forming the reflective layer. The thickness of the reflective layer was 9.6 nm, and the thicknesses of the first barrier layer and the second barrier layer were from 1 to 60 nm.

Example 7C

A light-scattering sheet was obtained in the same manner as in Example 1C except that the first barrier layer and the second barrier layer were formed by the same DC sputtering method using a ZnO target.

Example 8C

A light-scattering sheet was obtained in the same manner as Example 1C except that the first barrier layer and the barrier layer were formed by the same DC sputtering method using an aluminum oxide-containing zinc oxide ($Al_2O_3$: 3 mass %, ZnO: 97 mass %) target.

Example 9C

A light-scattering sheet was obtained in the same manner as in Example 1C except that the first barrier layer and the second barrier layer were formed by the same DC sputtering method using a tin oxide-containing indium oxide ($SnO_2$: 10 mass %, $In_2O_3$: 90 mass %) target.

Comparative Example 1C

A light-scattering sheet was obtained in the same manner as in Example 1C except that a reflective layer made of pure Ag was formed by sputtering using a pure Ag (4N) target containing no other metals, and a first barrier layer and a second barrier layer were not formed.

Comparative Example 2C

A light-scattering sheet was obtained in the same manner as in Example 1C except that using an AgAu (Ag=95 mass %, Au=5 mass %) target, a reflective layer having the same composition as this target was formed, and a first barrier layer and a second barrier layer were not formed.

<Evaluation of Multilayer Structure on Laminated Substrate>

By sputtering (transport film-forming method), a multilayer structure comprising a first barrier layer/reflective layer/second barrier layer, having the same composition as in each Example, was formed on a soda lime glass substrate having a thickness of (1.1±0.3) mm, to prepare a laminated substrate. At that time, by adjusting the transporting speed, the reflective layer was formed in such a thickness that the visible light transmittance of each multilayer structure including the glass substrate became about 60%.

With respect to each laminated substrate having the multilayer structure having the same composition as in each Example, the visible light transmittance, the visible light reflectance and the color of reflected light were measured. The measurement results are shown in Table 10.

A spectrophotometer (manufactured by HITACHI, Ltd., U4100) was used as the measuring apparatus.

The visible light transmittance was obtained by multiplying the value of the spectral transmittance at a wavelength of from 380 nm to 780 nm, by a duplex coefficient obtainable from the CIE daylight D65 spectrum and the wavelength distribution of the luminosity, followed by averaging.

The visible light reflectance was obtained by measurement under the condition of an incident angle of 5°, and multiplying the measured value by the duplex coefficient, followed by averaging in the same manner as for the visible light transmittance.

The color of reflected light is represented by converting a measured value of the visible light reflectance obtained from the spectrophotometer, to chromaticity coordinates (x, y) of the XYZ color system (JIS Z8701: 1999). Here, the measurement of the color of reflected light was carried out by painting the surface of the glass substrate on which the metal thin film was not formed, with black, so that the color of reflected light of the glass substrate would not be detected.

<Evaluation of Barrier Layer of Laminated Substrate>

By sputtering (transport film-forming method), a thin film having the same composition as the first barrier layer in each Example was formed on a soda lime glass substrate with a thickness of 1.1 mm (manufactured by Asahi Glass Company, Limited, trade name: JIS R3202 float glass, one having a refractive index of helium lamp d line (587.56 nm) of 1.589, and an Abbe number of 33), to prepare a laminate substrate. At that time, by adjusting the transporting speed, the thickness of each thin film was made to be (5±3) nm.

The color of reflected light of each thin film formed was measured in the same manner as in the case of the above-mentioned multilayer structure. The measurement results are shown also in Table 10.

<Evaluation of Thin Film of Third Metal of Laminated Substrate>

By sputtering (transport film-forming method), a thin film made of the third metal used in each Example was formed on a soda lime glass substrate with a thickness of 1.1 mm (manufactured by Asahi Glass Company, Limited, trade name: JIS R3202 float glass, one having a refractive index of helium lamp d line (587.56 nm) of 1.589, and an Abbe number of 33), in such a film thickness that the visible light transmittance including the glass substrate would be (60±1.5)%, to prepare a laminated substrate. At that time, by adjusting the transporting speed, the thickness of each film was adjusted. The color of reflected light of each thin film formed was measured in the same manner as in the case of the multilayer structure. The measurement results are shown also in Table 10.

TABLE 10

Evaluation of multilayer structure on laminated substrate

| | Composition of multilayer structure (barrier layer/reflective layer/barrier layer) | Visible light transmittance (%) | Visible light reflectance (%) | Color of reflected light of multilayer structure x (upper), y (lower) | Color of reflected light of barrier layer x (upper), y (lower) | Color of reflected light of third metal x (upper), y (lower) |
|---|---|---|---|---|---|---|
| Example 1C | Zr/AgAu/Zr | 61.34 | 16.42 | 0.3240 / 0.3410 | 0.3162 / 0.3352 | 0.3647 / 0.3315 |
| Example 2C | NiCr/AgAu/NiCr | 60.65 | 17.00 | 0.3333 / 0.3468 | 0.3234 / 0.3390 | 0.3647 / 0.3315 |
| Example 3C | $TiO_2$ + ZnO/AgAu/$TiO_2$ + ZnO | 60.08 | 34.83 | 0.3117 / 0.3270 | 0.3138 / 0.3377 | 0.3647 / 0.3315 |
| Example 4C | $Nb_2O_5$/AgAu/$Nb_2O_5$ | 60.01 | 37.48 | 0.3205 / 0.3234 | 0.3113 / 0.3349 | 0.3647 / 0.3315 |
| Comparative Example 1C | Nil/Ag/Nil | 60 | 32 | 0.3557 / 0.3641 | | |
| Comparative Example 2C | Nil/AgAu/Nil | 60 | 36 | 0.3571 / 0.3669 | | 0.3647 / 0.3315 |
| Example 5C | $TiO_2$ + ZnO/AgBiNd/$TiO_2$ + ZnO | 60.04 | 33.32 | 0.3108 / 0.3272 | 0.3138 / 0.3377 | Not measured |
| Example 6C | $TiO_2$ + ZnO/AgBiNdGe/$TiO_2$ + ZnO | 60.19 | 32.57 | 0.3109 / 0.3278 | 0.3138 / 0.3377 | Not measured |
| Example 7C | ZnO/AgAu/ZnO | 60.11 | 36.71 | 0.3193 / 0.3374 | 0.3229 / 0.3454 | 0.3647 / 0.3315 |
| Example 8C | $Al_2O_3$ + ZnO/AgAu/$Al_2O_3$ + ZnO | 60.20 | 36.21 | 0.3186 / 0.3322 | 0.3093 / 0.3335 | 0.3647 / 0.3315 |
| Example 9C | ITO/AgAu/ITO | 60.12 | 30.58 | 0.3082 / 0.3329 | 0.3205 / 0.3489 | 0.3647 / 0.3315 |

<Preparation of Reflective Transparent Screen 1>

The light-scattering sheet prepared in each of Examples 1C to 4C and Comparative Examples 10 to 2C was sandwiched between two sheets of glass, to prepare a reflective transparent screen 1 (see FIG. 3).

Specifically, soda lime glass (thickness: 2 mm), a polyvinyl butyral resin (hereinafter referred to as PVB) sheet (thickness: 0.38 mm), the light-scattering sheet of each Example, a PVB sheet, soda lime glass (thickness: 2 mm) were laminated in this order. The laminate was put into a vacuum chamber, heated at 120° C. for 1 hour, and further heated under 1 MPa at 130° C. for 90 minutes, to obtain a reflective transparent screen 1.

By looking at the other side through the reflective transparent screen 1 of each Example, it was possible to see through the sight up to a far distance. Further, as a result of projecting image light from a projector to the reflective transparent screen 1, it was possible to sufficiently recognize the image displayed on the reflective transparent screen 1.

(Visible Light Transmittance)

With respect to the reflective transparent screen 1 in each Example, the visible light transmittance was measured in the same manner as in the case of the above-mentioned laminated substrate, by using a spectrophotometer (manufactured by HITACHI, Ltd., U4100).

(Visible Light Reflectance)

With respect to the reflective transparent screen 1 in each Example, the visible light reflectance was measured in the same manner as in the case of the above-mentioned laminated substrate, by using a spectrophotometer (manufactured by HITACHI, Ltd., U4100).

(Haze)

With respect to the reflective transparent screen 1 in each Example, the haze was measured by using a haze meter (manufactured by Suga Test Instrument Co. Ltd., trade name: Haze Computer HZ-2).

The above measurement results of the visible light transmittance, the visible light reflectance and the haze are shown in Table 11.

(Heat Resistance)

The haze of the above laminate before heating was measured in the same manner as described above and compared with the haze of the reflective transparent screen 1 produced via the two heating steps, whereby the heat resistance of the reflective layer in each Example was evaluated by the following evaluation standards. The results are shown in Table 11.

⊚: The value of change in haze after heating relative to the haze before heating is within 1%, and the value of change in visible light transmittance after heating relative to the visible light transmittance before heating is within 2%.

○: The value of change in haze after heating relative to the haze before heating is within 2%, and the value of change in visible light transmittance after heating relative to the visible light transmittance before heating is within 3%.

Δ: The value of change in haze after heating relative to the haze before heating is within 2%, and the value of change in visible light transmittance after heating relative to the visible light transmittance before heating exceeds 3%.

x: The value of change in haze after heating relative to the haze before heating exceeds 2%, and the value of change in visible light transmittance after heating relative to the visible light transmittance before heating exceeds 3%.

TABLE 11

Evaluations of reflective transparent screen made into laminated glass

| | Composition of multilayer structure (barrier layer/reflective layer/barrier layer) | Visible light transmittance (%) | Visible light reflectance (%) | Haze | Heat resistance |
|---|---|---|---|---|---|
| Example 1C | Zr/AgAu/Zr | 66.90 | 7.653 | 1.7 | ○ |
| Example 2C | NiCr/AgAu/NiCr | 60.33 | 7.514 | 1.7 | ○ |
| Example 3C | $TiO_2$ + ZnO/AgAu/$TiO_2$ + ZnO | 63.71 | 7.76 | 2.1 | ○ |
| Example 4C | $Nb_2O_5$/AgAu/$Nb_2O_5$ | 61.74 | 6.544 | 2.1 | ○ |
| Comparative Example 1C | NiI/Ag/NiI | — | — | — | X |
| Comparative Example 2C | NiI/AgAu/NiI | 51.30 | 7.646 | 2.7 | Δ |
| Example 5C | $TiO_2$ + ZnO/AgBiNd/$TiO_2$ + ZnO | 76.3 | 5.9 | 2.8 | ○ |
| Example 6C | $TiO_2$ + ZnO/AgBiNdGe/$TiO_2$ + ZnO | 74.2 | 6.8 | 3.0 | ◎ |
| Example 7C | ZnO/AgAu/ZnO | 72.41 | 5.25 | | Δ |
| Example 8C | $Al_2O_3$ + ZnO/AgAu/$Al_2O_3$ + ZnO | 71.18 | 5.43 | | Δ |
| Example 9C | ITO/AgAu/ITO | 73.44 | 3.42 | | Δ |

In Table 11, measured values of the visible light transmittance, the visible light reflectance and the haze in Comparative Example 1C are not shown, but it was evident by visual observation that the metal thin film underwent a color change by heating. Further, it was confirmed that the change in haze due to heating exceeded 2%, and thus evaluation of heat resistance is "x."

In Example 5C and Example 6C, the sum of the visible light transmittance and the visible light reflectance was at least 80%, and thus, a reflective transparent screen with less visible light absorption was obtained.

In Example 5C, it is considered that Bi formed a thin Bi oxide film on the Ag alloy surface, and Nd improved the crystal orientation of the Ag, and thus they contributed to the improvement of the visible light transmittance and heat resistance.

In Example 6C, the contribution of Bi and Nd is considered to be the same as in Example 5C, and further, it is considered that Ge formed a thin Ge oxide film on the Ag alloy surface, and thus contributed to the improvement of the visible light transmittance and heat resistance.

(Sight See-Through Property)

The see-through property of a sight visible on the other side of the reflective transparent screen as viewed from the observer, was evaluated by the following standards. The evaluation results are shown in Table 12.

0: Good.

1: Good in a case where the front side is dark, or in a case where the outside light is less.

2: Such a level that rough recognition is possible.

3: The sight cannot be seen through.

(Image Visibility)

The visibility of an image displayed on the reflective transparent screen as viewed from the observer, was evaluated by the following standards. The evaluation results are shown in Table 12.

0: Good.

1: Good in a case where the environment is dark.

2: Such a level that rough recognition is possible.

3: The image is not visible.

(Improvement of Color Tone)

Improvement of the color tone of an image displayed on the reflective transparent screen as viewed from the observer, was evaluated by the following standards. The evaluation results are shown in Table 12.

0: The color tone is improved.

1: No improvement in color tone is observed.

TABLE 12

| | Example 1C | Example 2C | Example 3C | Example 4C | Comparative Example 1C | Comparative Example 2C | Example 5C | Example 6C | Example 7C | Example 8C | Example 9C |
|---|---|---|---|---|---|---|---|---|---|---|---|
| Sight see-through property | 0 | 0 | 0 | 0 | 2 | 1 | 0 | 0 | 0 | 0 | 0 |
| Image visibility | 0 | 0 | 0 | 0 | 2 | 1 | 0 | 0 | 0 | 0 | 0 |
| Improvement of color tone | 0 | 0 | 0 | 0 | 1 | 1 | 0 | 0 | 0 | 0 | 0 |

INDUSTRIAL APPLICABILITY

The reflective transparent screen of the first embodiment, the second embodiment or the third embodiment of the present invention is useful as a transparent member to be used for e.g. a showcase for commercial products, etc.; a display case for art works, etc.; a window of a building, a showroom, a vehicle, etc.; a glass door; an indoor transparent partition, etc. Specifically, it is useful as a transparent screen, whereby it is possible to see-through a sight visible on the other side of the transparent member as viewed from the observer side, and which visibly displays image light projected from a projector, as an image to the observer, at the time of transmitting information, such as description of commercial products, etc., states of various devices, destination guide, transmission matters, etc. to the observer, at the time of displaying the operation screens, etc. of various devices, or at the time of making it impossible to see through a sight of the other side of the transparent member to the observer, for the purposes of privacy protection, security, etc.

This application is a continuation of PCT Application No. PCT/JP2016/088533, filed on Dec. 22, 2016, which is based upon and claims the benefit of priority from Japanese Patent Application No. 2015-254803 filed on Dec. 25, 2015, Japanese Patent Application No. 2015-254808 filed on Dec. 25, 2015 and Japanese Patent Application No. 2015-255068 filed on Dec. 25, 2015. The contents of those applications are incorporated herein by reference in their entireties.

REFERENCE SYMBOLS

1: reflective transparent screen, 12: first transparent substrate, 14: second transparent substrate, 16: first adhesive layer, 18: second adhesive layer, 20: light-scattering sheet, 21: first transparent film, 22: first transparent layer, 23: metal thin film, 23a: metal thin film, 23b: reflective layer, 24: second transparent layer, 25: second transparent film, 80: projector, A: first surface, B: second surface, L: image light, X: observer, 26: first barrier layer, 27: second barrier layer.

What is claimed is:

1. A reflective transparent screen having a metal thin film, wherein
   the metal thin film is constituted by an alloy comprising Ag and at least two types of metal M selected from the group consisting of Pd, Au, Pt, Ir, Rh, Bi, Nd and Ge including at least one of Nd and Ge in said group, wherein the content of Ag to the total number of metal atoms is at least 65 atomic %; and
   wherein a concavo-convex structure is provided on at least a part of a surface of a transparent resin layer in contact with the metal thin film.

2. The reflective transparent screen according to claim 1, wherein in the alloy, the content ratio of the number of atoms of metal M to the number of atoms of Ag (M/Ag) is from 0.001 to 0.35.

3. The reflective transparent screen according to claim 1, wherein the thickness of the metal thin film is from 1 nm to 100 nm.

4. The reflective transparent screen according to claim 1, wherein the concavo-convex structure is an irregular concavo-convex structure.

5. A reflective transparent screen having a metal thin film, wherein
   the metal thin film is constituted by an alloy comprising Ag and at least one type of metal M' other than Ag, wherein the at least one type of metal M' is selected from the group consisting of Zn, Pd, In, W and Mo, wherein the content of Ag to the total mass is from 70 to 95 mass %, and
   the metal other than Ag is one such that the color of reflected light of a thin film of a simple substance of the metal other than Ag, formed on a glass substrate having a thickness of (1.1±0.3) mm (one having a refractive index of helium lamp d line (587.56 nm) of 1.589 and an Abbe number of 33) in such a film thickness that the visible light transmittance including the glass substrate would be (60±1.5)%, would be x<0.35 and y<0.35 by chromaticity coordinates (x, y) of the XYZ color system (JIS Z8701: 1999);
   wherein a concavo-convex structure is provided on at least a part of a surface of a transparent resin layer in contact with the metal thin film.

6. The reflective transparent screen according to claim 5, wherein the alloy is one such that the visible light reflectance of a thin film of the alloy, formed on a glass substrate having a thickness of (1.1±0.3) mm (one having a refractive index of helium lamp d line (587.56 nm) of 1.589 and an Abbe number of 33) in such a film thickness that the visible light transmittance including the glass substrate would be at least 60%, would be at least 15%.

7. The reflective transparent screen according to claim 5, wherein the total content of the metal other than Ag in the entire mass of the alloy is from 5 to 30 mass %.

8. The reflective transparent screen according to claim 5, wherein the concavo-convex structure is an irregular concavo-convex structure.

* * * * *